United States Patent [19]

Okura

[11] Patent Number: 5,231,898
[45] Date of Patent: Aug. 3, 1993

[54] METHOD AND APPARATUS FOR CONTROLLING TRANSMISSION SYSTEM

[75] Inventor: Yasunori Okura, Kanagawa, Japan

[73] Assignee: Kabushiki Kaisha Komatsu Seisakusho, Tokyo, Japan

[21] Appl. No.: 965,622

[22] Filed: Oct. 22, 1992

Related U.S. Application Data

[63] Continuation of Ser. No. 571,540, Aug. 27, 1990.

[30] Foreign Application Priority Data

Nov. 24, 1988 [JP] Japan .................. 63-296827
Nov. 24, 1988 [JP] Japan .................. 63-296828

[51] Int. Cl.⁵ ............................. B60K 41/06
[52] U.S. Cl. ............................. 74/866; 74/867
[58] Field of Search ............. 74/866, 867; 192/0.044, 192/0.052, 0.075, 0.076

[56] References Cited

U.S. PATENT DOCUMENTS

| | | | |
|---|---|---|---|
| 4,690,017 | 9/1987 | Taniguchi et al. | 74/866 |
| 4,707,789 | 11/1987 | Downs et al. | 74/867 X |
| 4,757,449 | 7/1988 | Kurihara et al. | 74/866 X |
| 4,951,200 | 8/1990 | Leising et al. | 74/866 X |

FOREIGN PATENT DOCUMENTS

56-73248 6/1981 Japan .
58-149449 9/1983 Japan .
60-9485 4/1985 Japan .

Primary Examiner—Richard M. Lorence
Assistant Examiner—Benjamin Levi
Attorney, Agent, or Firm—Diller, Ramik & Wight

[57] ABSTRACT

In a configuration in which electronically operated pressure control valves (31–36) are respectively connected to clutches of a two-stage transmission (3) composed of main transmissions (1st, 2nd, R, 4th, 3rd) and sub transmissions (L, H), when a downshift is effected from a present speed stage to a next speed stage with power on, the supply of oil pressure to a speed-changing clutch for the present speed stage is stopped on the basis of a speed-change command, the pressure control valve is actuated when a relative number of revolutions of the speed-changing clutch for the next speed stage becomes zero, which commences the supply of oil pressure to that speed-changing clutch, and the supply of oil pressure is gradually increased upon confirming the completion of a filling time of the speed-changing clutch. Thus discomfort owing to a speed-change shock is prevented in whatever state the amount of an accelerator operated and the state of operation of a brake are.

In addition, in a downshift accompanying the operation of clutches of both transmissions, torque off time is not provided for the sub transmission clutch, and the supply of oil pressure to a next stage clutch is commenced immediately so as to supply oil pressure at a gradually increasing rate. After engagement of the clutch, the supply of oil pressure to the main transmission clutch at a gradually increasing rate is effected upon completion of the filling time, thereby preventing discomfort attributable to a speed-change shock.

4 Claims, 20 Drawing Sheets

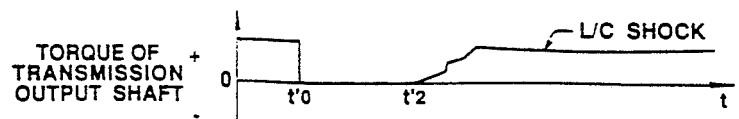

FIG.7(a) TORQUE OF TRANSMISSION OUTPUT SHAFT

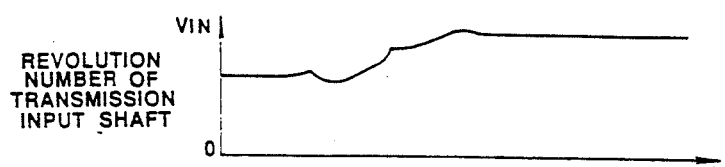

FIG.7(b) REVOLUTION NUMBER OF TRANSMISSION INPUT SHAFT

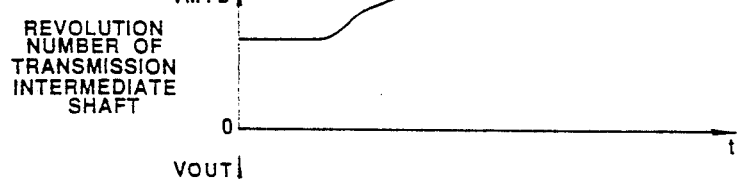

FIG.7(c) REVOLUTION NUMBER OF TRANSMISSION INTERMEDIATE SHAFT

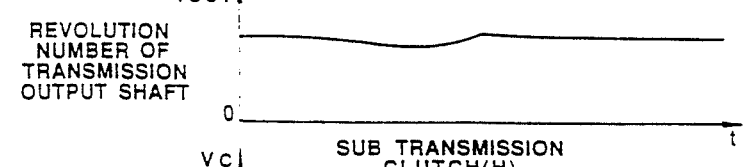

FIG.7(d) REVOLUTION NUMBER OF TRANSMISSION OUTPUT SHAFT

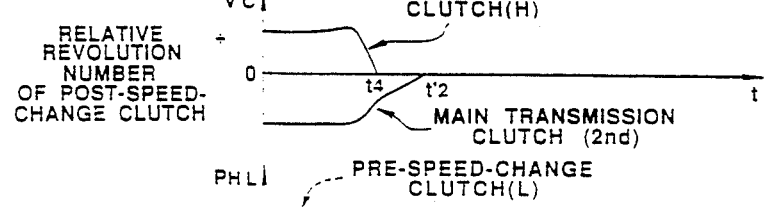

FIG.7(e) RELATIVE REVOLUTION NUMBER OF POST-SPEED-CHANGE CLUTCH

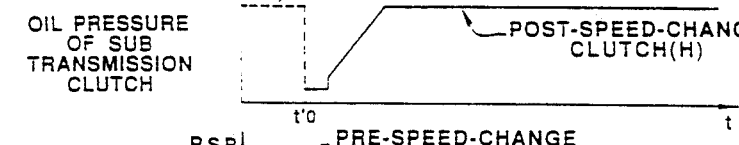

FIG.7(f) OIL PRESSURE OF SUB TRANSMISSION CLUTCH

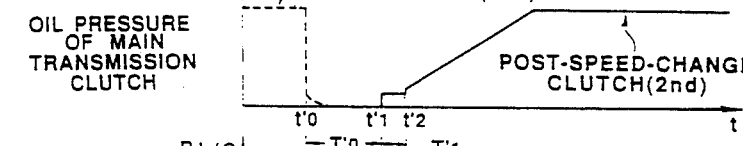

FIG.7(g) OIL PRESSURE OF MAIN TRANSMISSION CLUTCH

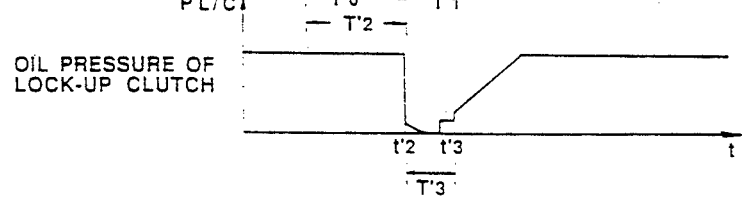

FIG.7(i) OIL PRESSURE OF LOCK-UP CLUTCH

FIG. 16

| SPEED CHANGE MODE / AMOUNT OF ACCELERATOR OPERATED AND OPERATIONAL STATE OF BRAKE | SHIFT UP | | | | | | | SHIFT DOWN | | | | | | |
|---|---|---|---|---|---|---|---|---|---|---|---|---|---|---|
| | N-F1 | F1-F2 | F2-F3 | F3-F4 | F4-F5 | F5-F6 | F6-F7 | F1-F2 | F2-F3 | F3-F4 | F4-F5 | F5-F6 | F6-F7 |
| FULL(S5) | | P↓PT5 dp/dt | | | INCREASE RATE dp/dt HIGH | | ↑ | | | | INCREASE RATE dp/dt HIGH | | ↑ |
| PARTIAL(S4) | | PT4 | | | INCREASE RATE dp/dt HIGH | | ↑ | | | | INCREASE RATE dp/dt HIGH | | ↑ |
| PARTIAL(S3) | | PT3 | | | INCREASE RATE dp/dt HIGH | | ↑ | | | | INCREASE RATE dp/dt HIGH | | ↑ |
| PARTIAL(S2) | | PT2 | | | INCREASE RATE dp/dt HIGH | | ↑ | | | | INCREASE RATE dp/dt HIGH | | ↑ |
| IDLE(S1) | | P↓PT1 dp/dt | | | INCREASE RATE dp/dt HIGH | | ↑ | | | | INCREASE RATE dp/dt HIGH | | ↑ |
| BRAKE ON | | P↓PT6 dp/dt | | | INCREASE RATE dp/dt HIGH | | ↑ | | | | INCREASE RATE dp/dt HIGH | | ↑ |

FIG. 22(a) (PRIOR ART) TORQUE OF TRANSMISSION OUTPUT SHAFT

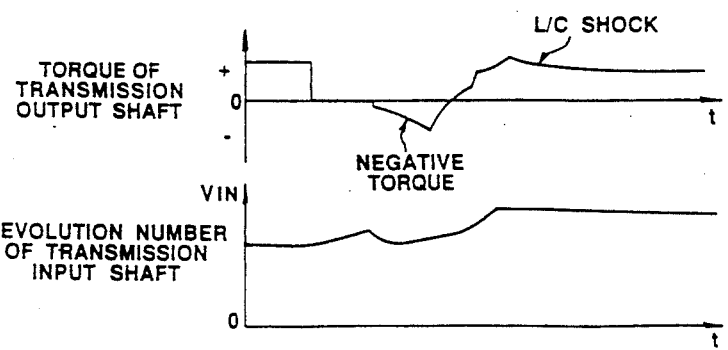

FIG. 22(b) (PRIOR ART) REVOLUTION NUMBER OF TRANSMISSION INPUT SHAFT

FIG. 22(c) (PRIOR ART) REVOLUTION NUMBER OF TRANSMISSION INTERMEDIATE SHAFT

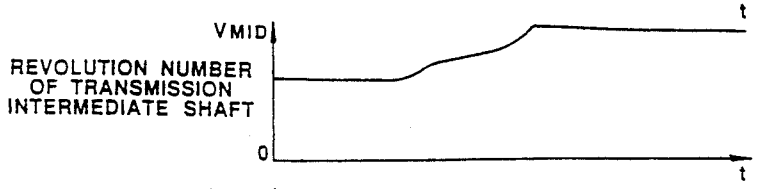

FIG. 22(d) (PRIOR ART) REVOLUTION NUMBER OF TRANSMISSION OUTPUT SHAFT

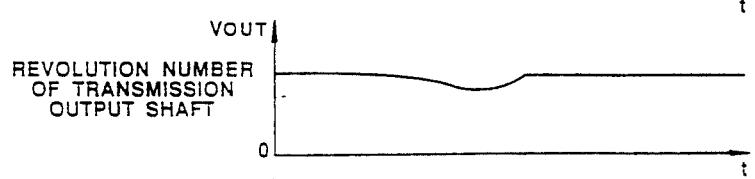

FIG. 22(e) (PRIOR ART) RELATIVE REVOLUTION NUMBER OF POST-SPEED-CHANGE CLUTCH

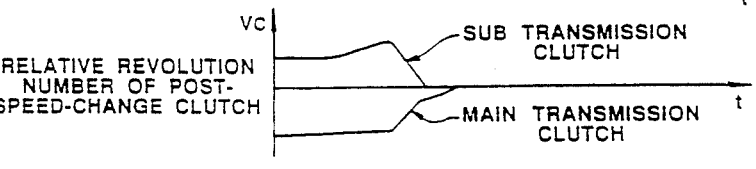

FIG. 22(f) (PRIOR ART) OIL PRESSURE OF SUB TRANSMISSION CLUTCH

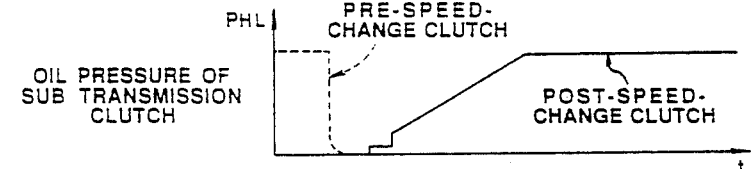

FIG. 22(g) (PRIOR ART) OIL PRESSURE OF MAIN TRANSMISSION

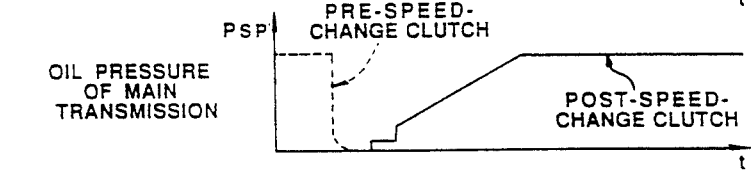

FIG. 22(i) (PRIOR ART) OIL PRESSURE OF LOCK-UP CLUTCH

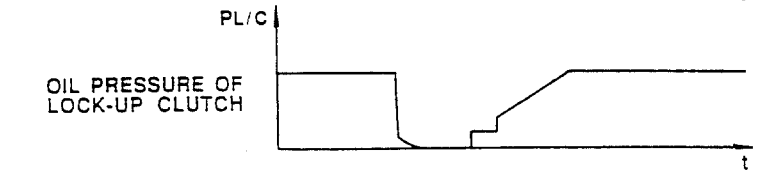

METHOD AND APPARATUS FOR CONTROLLING TRANSMISSION SYSTEM

This application is a continuation of application Ser. No. 07/571,540, filed Aug. 27, 1990, now abandoned.

DESCRIPTION

1. TECHNICAL FIELD

The present invention relates to a method and an apparatus for controlling a transmission system mounted on a vehicle such as a travelling machine, a construction machine, or the like, and more particularly to a method and an apparatus suitable for preventing discomfort attributable to a speed-change shock.

2. BACKGROUND ART

In recent years, a demand for reducing a speed-change shock in a construction machine such as a dump truck has been expressed by operators (users).

As is well known, by the speed-change shock referred to herein is meant a shock which is produced when the acceleration in the longitudinal direction of a vehicle changes within a short period of time due to the fact that the driving-side torque does not match the load-side torque at the time of a speed change.

Particularly in cases where a downshift is effected with power on such as when a vehicle including a construction machine or the like travels from a flat road to a sloping road, the following speed-change shock is produced.

Namely, as shown in FIG. 21(c), in cases where the oil pressure of a speed changing clutch currently being engaged (hereinafter referred to as the pre-speed-changing clutch) is set to zero upon the issuance of a speed-change command, the supply of pressure oil to a speed-change clutch to be engaged next (hereinafter referred to as the post-speed-changing clutch) is simultaneously commenced, and an oil pressure mediation is subsequently executed in such a manner as to gradually increase the pressure of the post-speed-change clutch, then sudden torque fluctuations extending over both positive and negative sides, as shown in the part (a) of the drawings, occur at the output shaft.

In particular, such sudden torque fluctuations extending over the positive and negative sides impart discomfort to the operator.

The mechanism of the aforementioned speed-change shock is generally explained as follows.

That is, as for the numbers of revolutions of the rotating bodies of the post-speed-change clutch, since a downshift is effected, the number of revolutions of the output side of the transmission is higher than the number of revolutions of the input side (the relative number of revolutions is negative, see the part (b) of FIG. 21). For this reason, the clutch-engaging torque becomes negative until the two sides come to rotate in a matched manner during engagement of the clutch, and this causes the speed-change shock.

Here, it is assumed that the relative number of revolutions is expressed as one in which the number of revolutions of the output-side rotating body is subtracted from the number of revolutions of the input-side rotating body.

Accordingly, in order to reduce the aforementioned speed-change shock, the present inventors have made an attempt in which a time lag (this time will be referred to as the torque off time) is deliberately provided from the point of time when the oil pressure of the pre-speed-change clutch has become zero until the point of time when a gradual increase in the oil pressure of the post-speed-change clutch is commenced, and the clutch is engaged after the relative number of revolutions of the post-speed-change clutch is synchronized with zero.

In addition, in a transmission system having a two-stage configuration composed of a sub transmission and a main transmission, at the time of a downshift with power on for which speed-changing clutches on both sides need to be engaged, the following control is carried out on the basis of the technique of providing the aforementioned torque off time.

Namely, as shown in the parts (f) and (g) of FIG. 22, the oil pressure of respective pre-speed-change clutches of the sub transmission-side speed-changing clutch (hereinafter referred to as the sub transmission clutch) and the main transmission-side speed-changing clutch (hereinafter referred to as the main transmission clutch) is set to zero simultaneously, and a gradual increase in the oil pressure of the two post-speed-change clutches is simultaneously commenced after a lapse of the torque off time from that point of time.

When this control is effected, a long time is required until the relative numbers of revolutions of the two post speed-change clutches become synchronous, as shown in the part (e) of the drawing, and it can be seen that particularly the main transmission clutch still shows a negative value even after the point of time when a gradual increase in the clutch pressure for that clutch is commenced. For this reason, since negative torque is produced at the output shaft during engagement of the main transmission clutch, as shown in the part (a) of the drawing, fluctuations extending over the positive and negative sides occur at the output shaft, which imparts discomfort to the operator.

In addition, as a conventional technique for reducing a speed-change shock, for instance, one shown in FIG. 23 is known.

In this technique, control is effected in such a manner that the filling time of a speed-changing clutch to be engaged next (hereinafter referred to as the post-speed change clutch) is completed before the oil pressure acting on a speed-changing clutch being presently engaged (hereinafter referred to as the pre-speed-change clutch) is set to zero. At the same time, a holding pressure $P_1$ of the pre-speed-change clutch and an initial pressure $P_2$ of the post-speed-change clutch are controlled so as to be variable in correspondence with an amount of the accelerator pedal pressed (corresponding to engine load), thereby eliminating the discontinuity of torque. For instance, in terms of the initial pressure $P_2$, when the amount of pressing is large, $P_2$ is set to a high level, while when the amount of pressing is small, $P_2$ is set to a low level.

With this conventional technique, although the initial pressure of the post-speed-change clutch is made variable in response to the amount of the accelerator pedal pressed, an increase rate $dp/dt$ for gradually increasing oil pressure for the post-speed-change clutch is constantly fixed.

In cases where the increase rate $dp/dt$ is uniformly set in the above-described manner, the following problem occurs.

Generally, the speed-change shock is quantitized by a jerk value J, i.e., a rate of change in the acceleration of the vehicle, and this rate of change is proportional to the increase rate $dp/dt$ of the clutch pressure. In addition, if the speed-change shock is considered as the operator's sensitivity evaluation value, even if the rate of change in the acceleration of the vehicle (i.e., this meaning the aforementioned increase rate dp/dt) is the same, the aforementioned evaluation value differs according to the state of the amount of the accelerator pedal pressed. In other words, in the state with the accelerator pedal is pressed (power on), the operator has the intention to accelerate the speed, even if a speed-change shock occurs, the operator does not feel it as appreciable discomfort, and in some cases he or she would even feel the speed-change shock as being fraught with a sense of acceleration and as a good feeling (comfort) derived from sufficient torque. On the other hand, in the state in which the accelerator pedal is not pressed (power off), since the output shaft torque is small, even if relatively small torque fluctuations occur at the output shaft, the operator may feel them as a large speed-change shock.

Accordingly, in cases where the oil pressure increase rate dp/dt of the post-speed-change clutch is set to a uniform level as in the case of the prior art, when the amount of the accelerator pedal pressed is large, the operator does not feel the torque fluctuations, such as those shown at the arrow F in FIG. 23, as a speed-change shock, but when the amount of the accelerator pedal pressed is small, he or she would in some cases feel the similar torque fluctuations as a speed-change sock. Thus, with the conventional technique, it has been impossible to completely overcome the discomfort imparted to the operator as a result of the speed-change shock.

In addition, when the oil pressure increase rate dp/dt is considered from the viewpoint of the durability of the speed-changing clutches, at the time of a high load (when the amount of the accelerator operated is large), it is desirable to engage the post-speed-change clutch speedily, thereby preventing damage caused by the thermal load acting on the clutch. Accordingly, it is necessary to set the oil pressure increase rate dp/dt to a high level. Conversely, in cases where the post-speed-change clutch is engaged at a low oil pressure increase rate dp/dt at the time of a high load, a long time is required in engagement, and there is the possibility of appreciably impairing the durability of the clutch.

Furthermore, at the time when a brake is being operated, since an excessively large negative torque is applied to the engine side, the engine is placed under a high load. If a speed change is effected at this point of time, the durability of the post-speed-change clutch is appreciably impaired in a similar manner. Accordingly, it is necessary to increase the oil pressure increase rate dp/dt in order to avoid this.

The present invention has been devised in view of the above-described circumstances, and has as its primary object to prevent discomfort imparted to an operator by preventing negative torque from being produced at the output shaft when a downshift is effected with power on, and has as its second object to always prevent discomfort attributable to a speed-change shock in whatever state an amount of the accelerator operated and the state of operation of the brake are, and at the same time to improve the durability of speed-changing clutches.

DISCLOSURE OF THE INVENTION

In accordance with a first aspect of the invention, when a present speed stage is shifted down to a next speed stage with power on, a pressure control valve for a speed-changing clutch is controlled by the following steps:

- turning off the pressure control valve pertaining to the speed-changing clutch in the present speed stage upon the issuance of a speed-change command;
- actuating the pressure control valve corresponding to the speed-changing clutch in the next speed stage at an operation start timing when a filling time of the speed-changing clutch is completed, at a point of time when the relative number of revolutions of the speed-changing clutch becomes zero, so as to supply pressure oil to the speed-changing clutch; and
- confirming the completion of the filling time of the speed-changing clutch, and subsequently controlling the pressure control valve pertaining to the speed-changing clutch in such a manner as to gradually increase the oil pressure of the speed-changing clutch.

That is, if the above-described control is effected, at the point of time when the oil pressure of the speed-changing clutch in the present speed stage has become zero, a rotating body on the input shaft side of the speed-changing clutch in the next speed stage begins to rotate in a free state, and its number of revolutions tries to rise toward a number of revolutions synchronized with that of the output shaft-side rotating body. Since the state is that of power on, if the torque is set to off, the input shaft-side rotating body comes to rotate in a matched manner.

In due course of time, at the point of time when the relative number of revolutions of the speed-changing clutch in the next speed-change stage becomes zero, the supply of pressure oil to the speed-changing clutch is commenced at a timing when the filling time of the speed-changing clutch is completed.

Then, upon completion of the filling time of the aforementioned speed-changing clutch, the numbers of revolutions of the rotating bodies of the speed-changing clutch are synchronized, and engagement is subsequently effected in the synchronized state. For this reason, negative-side torque does not occur at the output shaft of the transmission. Accordingly, it is possible to reduce the uncomfortable speed-change shock at the time of a downshift with power on, thereby making it possible to substantially alleviate the operator's fatigue.

The timing at which the supply of pressure oil to the speed-changing clutch in the next speed stage is commenced is determined in advance through experiments and simulations as a time from the point of time when the oil pressure of the speed-changing clutch in the present speed stage has disappeared until the point of time when the supply of pressure oil to the speed-changing clutch in the next speed stage is commenced.

In addition, the aforementioned timing may be the following one: The relative number of revolutions of the speed-changing clutch in the next speed stage is detected consecutively, and a predetermined relative number of revolutions is set in which the relative number of revolutions becomes zero upon completion of the filling time if the supply of pressure oil to the speed-changing clutch is commenced from the point of time of that relative number of revolutions. At the point of time when the relative number of revolutions detected has reached the aforementioned predetermined number of revolutions, the supply of pressure oil to the speed-changing clutch in the next speed stage is commenced, which is the timing mentioned above.

In addition, in accordance with a second aspect of the invention, in a transmission system for selecting a speed stage through a combination of sub transmission clutches and main transmission clutches, when the clutches to be engaged at the time when a present speed stage is shifted down to a next speed stage with power on are both the sub transmission clutch and the main transmission clutch, the aforementioned pressure control valve is controlled by the following steps:

turning off respectively the pressure control valves pertaining to the sub transmission clutch and the main transmission clutch in the present speed stage upon the issuance of a speed-change command; and starting the supply of pressure oil to the sub transmission clutch in the next speed stage at a point of time when the pressure control valve pertaining to the sub transmission clutch in the present speed stage is turned off, and subsequently controlling the pressure control valve pertaining to the sub transmission clutch in such a manner as to gradually increase the pressure of the sub transmission clutch.

Then, with respect to the main transmission clutch in the next speed stage, the supply of pressure oil is commenced at the same timing as the first aspect of the invention, and control is effected in such a manner as to gradually increase the oil pressure of that clutch upon completion of the filling time.

Namely, in the control of this invention, torque off time is provided for the main transmission side alone, while the torque off time is not provided for the speed change on the sub transmission side. The speed change of the sub transmission is completed during the torque off time of the main transmission side, and similar control to that of the first aspect of the invention is carried out for the main transmission side, thereby reducing a speed-change shock.

That is, in accordance with the second aspect of the invention, the oil pressure of both the sub transmission clutch and the main transmission clutch in the present speed stage becomes zero simultaneously with the start of speed change. At this juncture, torque off time is not provided for the sub transmission clutch in the next speed stage, pressure oil is supplied immediately thereto, and the oil pressure is subsequently gradually increased before the completion of engagement of that sub transmission clutch. Torque fluctuations occurring at this juncture do not appear at the output shaft of the transmission as torque fluctuations since the main transmission side is in the torque off time.

In due course of time, similar control to that of the first aspect of the invention is conducted with respect to the main transmission clutch in the next speed stage. For this reason, negative-side torque does not occur at the output shaft of the transmission. Accordingly, it is possible to reduce the uncomfortable speed-change shock at the time of a downshift with power on, thereby substantially alleviating the operator's fatigue.

In addition, in accordance with a third aspect of the invention, the following are provided: first detecting means for detecting an amount of an accelerator operated; second detecting means for detecting a state of operation of a brake; third detecting means for detecting a speed stage for speed changing; and controlling means which determines a rate of gradual increase of oil pressure applied to the speed-changing clutch to be engaged, on the basis of detection outputs of the first, second, and third detecting means, and which outputs an electric command corresponding to the oil pressure gradual increase rate determined to the pressure control valve corresponding to the speed-changing clutch to be engaged.

In accordance with the above-described arrangement, the oil pressure gradual increase rate dp/dt is controlled to be variable by three parameters, the amount of the accelerator operated, the state of operation of the brake, and the speed-changing speed stage. That is, the present invention focuses its attention on the fact that the speed-change shock is determined by the operator's sensitivity evaluation, and by rendering the dp/dt variable, the jerk value J used as a standard value of the speed-change shock is made variable as a result. The jerk value J is expressed as $$J = d\alpha/dt \propto dp/dt$$

($\alpha$: acceleration of the vehicle)

Accordingly, the clutch is engaged in such a manner that the operator constantly feels comfort regardless of the amount of the accelerator operated, the state of operation of the brake, and the speed stage to which the speed is changed. In consequence, the operator's fatigue is substantially alleviated, and the durability of the clutches is improved remarkably.

BRIEF DESCRIPTION OF THE DRAWINGS

FIG. 7(a)–(i) is a timing chart illustrating the manner of changes in various elements of a transmission system in a case where the flowchart shown in FIG. 4 is executed;

FIG. 16 is a diagram conceptually illustrating contents that are stored in a memory inside the controller shown in FIG. 1;

FIGS. 21(a)-(d), 22(a)-(i) and 23(a)-(b) are timing charts illustrating the manner in which the elements of the transmission system undergo changes when the prior art control of a transmission system is executed.

BEST MODE FOR CARRYING OUT THE INVENTION

A detailed description will now be given of the present invention in accordance with the embodiments shown in the appended drawings. First, a description will be given of a first embodiment of the present invention.

Figure 1:
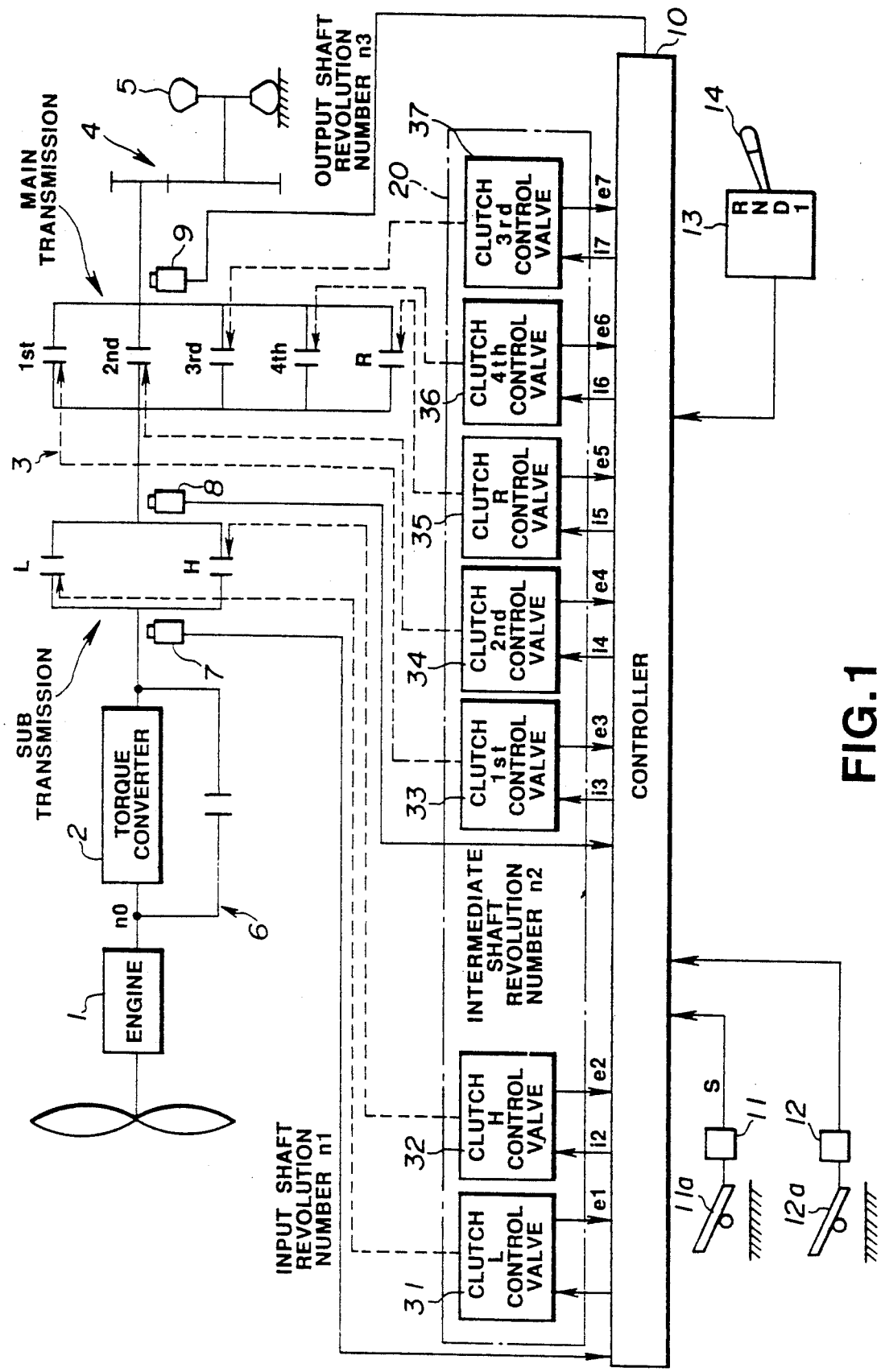
FIG. 1 is a block diagram conceptually illustrating an apparatus embodying a method and an apparatus for controlling a transmission system in accordance with the present invention.

FIG. 1 is a block diagram conceptually illustrating an apparatus embodying a method and an apparatus for controlling a transmission system in accordance with the present invention.

It should be noted that in this embodiment a case is assumed in which the aforementioned apparatus is mounted on a construction vehicle such as a dump truck or the like.

In FIG. 1, an output of an engine 1 is transmitted to a transmission 3 via a torque converter 2, and an output of the transmission 3 is transmitted to drive wheels 5 via a differential gear/final reducing gear 4. Interposed between input and output shafts of the torque converter 2 is a lock-up clutch 6 for directly coupling these shafts.

Revolution sensors 7, 8, and 9 respectively outputting signals representative of values corresponding to the numbers of revolutions $n_1$, $n_2$, $n_3$ of an input shaft of the transmission 3, an intermediate shaft disposed between a sub transmission and a main transmission, which will be described later, and an output shaft of the transmission 3 are provided for the transmission 3. Outputs of these sensors are applied to a controller 10.

Figure 15:
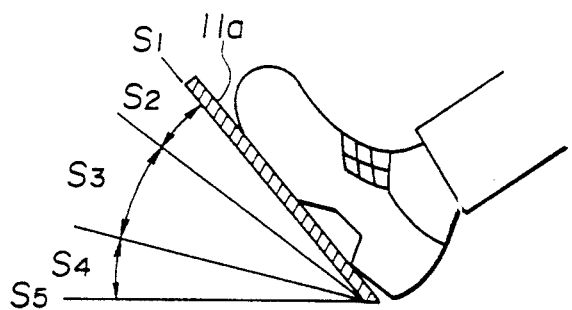
FIG. 15 is a diagram illustrating amounts of a accelerator pedal pressed which is shown in FIG. 1.

A throttle amount sensor 11 is provided on an accelerator pedal 11a, and the sensor 11 is adapted to detect an amount of the throttle pedal 11a pressed and input a signal S (S1-S5, see FIG. 15) representative of this amount of pressing to the controller 10. A brake sensor 12 is provided on a brake pedal 12a, and the sensor 12 detects whether or nor the brake has been actuated and inputs the detected value to the controller 10. A shift selector 13 inputs to the controller 10 a signal representative of a shift position (R, N, D, 1, . . . ) selected by a shift lever 14.

The controller 10 determines a speed stage for automatically effecting a speed change on the basis of a shift position signal inputted from the shift selector 13, and shifts up or down the speed of the transmission 3 one stage at a time via a clutch oil pressure supplying device 20 for controlling the pressure of a speed-changing clutch corresponding to the speed stage of the transmission 3 on the basis of a signal representative of the number of revolutions ($n_1$) of the input shaft and the throttle signal S respectively inputted from the revolution sensor 7 and the throttle amount sensor 11 in such a manner that an optimum speed stage will be obtained among the aforementioned speed stages in which the automatic speed change is possible.

Figure 13:
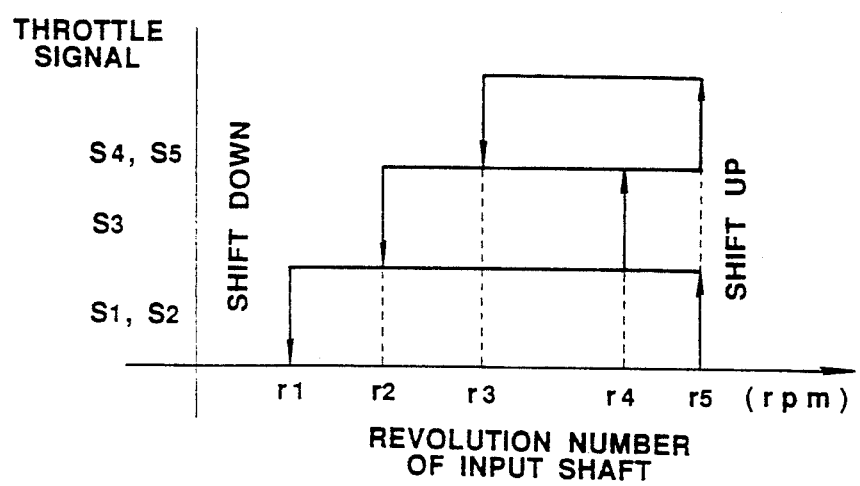
FIG. 13 is a diagram used for explaining the judgement of a timing for effecting an automatic speed change.

When the shift position D has been selected by the shift lever 14, if it is assumed that automatic speed change is possible for the speed stages of Forward 1st to Forward 7th, the speed change of an upshift or downshift in these speed stages is effected with patterns shown in FIG. 13 in correspondence with the number of revolutions $n_1$ of the input shaft and the throttle signal S. In other words, in cases where the throttle signal is S3 (see FIG. 15), when the number of revolutions $n_1$ of the input shaft becomes $r_4$ or more, a downshift is effected by one speed. In addition, a downshift with power on, which is a subject of the present invention, is a downshift at the time when a driving force is being transmitted to a traveling system, and this power on downshift is valid when the throttle pedal 11a is pressed when traveling with the number of revolutions of the input shaft at $r_3$ or less and when the throttle signal is S4, S5.

The transmission 3 comprises sub transmission clutches L (Low) and H (High) in the first stage that are connected to the output shaft of the torque converter 2 as well as main transmission clutches 1st, 2nd, 3rd, 4th and R in the second stage that are connected to the output shaft of the transmission 3. As shown in Table 1 below, through a combination the sub transmission side clutches H, L and the main transmission side clutches 1st, 2nd, 3rd, 4th, and R (those marked with a circle in the table), a speed stage is selected from among Rev (Reverse), Neu (Neutral), F1 (Forward 1st), F2 (Forward 2nd), F3 (Forward 3rd), F4 (Forward 4th), F5 (Forward 5th), F6 (Forward 6th), and F7 (Forward 7th).

Figure 10:
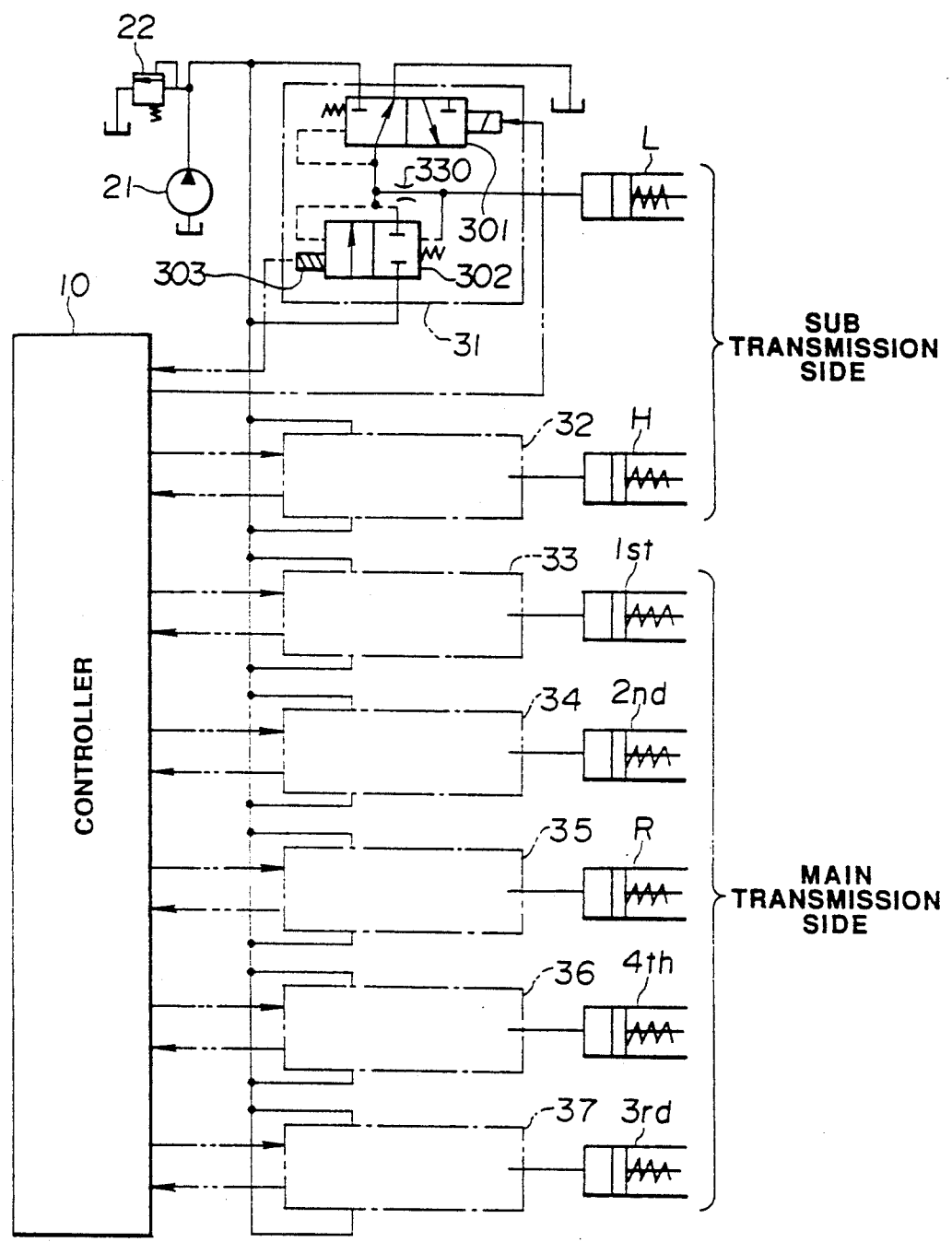
FIG. 10 is a hydraulic circuit diagram illustrating an internal configuration of a clutch oil pressure supplying device in the apparatus shown in FIG. 1.

As shown in FIG. 10, the clutch pressure oil supplying device 20 for supplying pressure oil to these clutches comprises an oil pressure pump 21 and a relief valve 22, as well as clutch oil pressure control valves 31, 32, 33, 34, 35, 36, and 37 adapted to apply oil pressure to the clutches L, H, 1st, 2nd, R, 4th, and 3rd, respectively, and provided separately for the respective clutches. In addition, the lock-up clutch 6 also has an electronically operated pressure-proportional control valve (not shown) for applying oil pressure to said clutch. These valves 31-37

TABLE 1

|  | Rev | Neu | F1 | F2 | F3 | F4 | F5 | F6 | F7 |
|---|---|---|---|---|---|---|---|---|---|
| Clutch H |  |  |  |  | O |  | O | O | O |
| Clutch L | O |  | O | O |  | O |  | O |  |
| Clutch 1st |  |  | O |  |  |  |  |  |  |
| Clutch 2nd |  |  |  | O | O |  |  |  |  |
| Clutch 3rd |  |  |  |  |  | O | O |  |  |
| Clutch 4th |  |  |  |  |  |  |  | O | O |
| Clutch R | O |  |  |  |  |  |  |  |  | are independently actuated by means of electric commands $i_1$-$i_7$ from the controller 10. It should be noted that the oil pressure control valves 31-37 which will be described below are respectively provided with filling sensors for detecting each completion of filling, the filling sensors being adapted to input detection signals $e_1-e_7$ to the controller 10.

Figure 11:
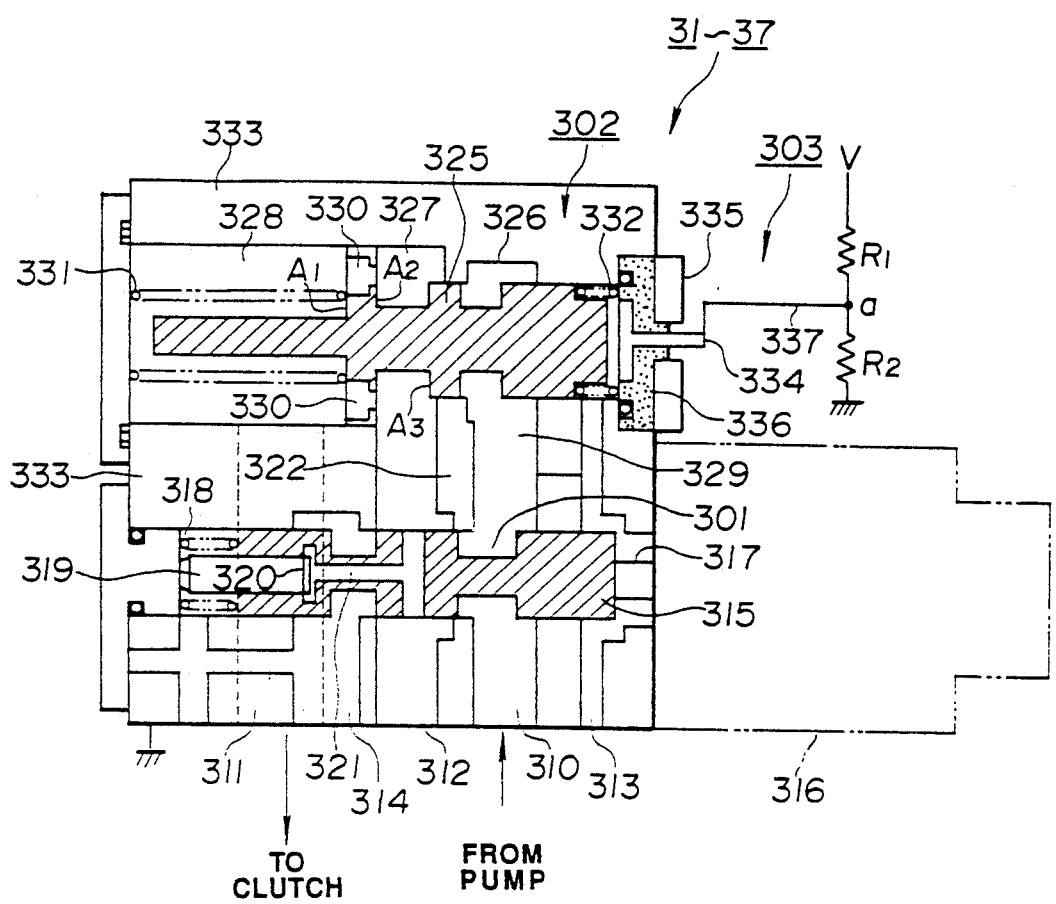
FIG. 11 is a cross-sectional view illustrating an internal configuration of a clutch oil pressure controlling valve.

FIG. 11 illustrates a configuration of the aforementioned clutch oil pressure control valves 31-37, and these clutch oil pressure control valves 31-37 are respectively composed of a pressure control valve 301 for controlling clutch oil pressure, a flow-rate detection valve 302, and a sensor element 303 for detecting the completion of filling, as shown in FIG. 10 as well. The pressure control valve 301 is controlled by the controller 10, while a detection signal of each of the sensor elements 303 is inputted to the controller 10.

Each of the clutch oil pressure control valves 31 37 allows oil from the pump 21 to flow in via an input port 310 and supplies the oil to each clutch via an output port 311. A port 312 is closed, while ports 313, 314 are drain ports.

The electronically operated pressure control valve 301 has a spool 315, a right-hand end of the spool 315 abuts against a plunger 317 of a proportional solenoid 316, and a spring 318 being provided at a left-hand end thereof. Pressure oil of an oil passage 322 is fed back to an oil chamber 320 defined by the spool 315 and a piston 319 via an oil chamber 321 formed in the spool 315.

The flow-rate detection valve 302 has a spool 325, which defines coil chambers 326, 327, and 328. An orifice 330 is formed between the oil chambers 327, 328 of this spool 325. The spool 325 is arranged to have three different pressure-receiving areas $A_1$, $A_2$, and $A_3$ which are provided with relationships of $A_1+A_3>A_2$ and $A_2>A_3$. A spring 331 is disposed on a left end of the spool 325, and a spring 332 is disposed on a right end thereof. The spool 325 is arranged to maintain its neutral position shown in FIG. 10 with the springs 331, 332 set at the positions of their free lengths when the pressure is not built up in the oil chambers 327, 328. That is, in this case, the spring 331 acts as a return spring for the spool 325, while the spring 332 acts as a pressure-setting spring for detecting the oil pressure of the clutch.

A metallic detecting pin 334 is disposed on the right hand side of an upper portion of a valve body 333, and this detecting pin 334 detects that the spool 325 has moved from its neutral position shown in FIG. 10 to the right against a spring force of the spring 332. This detection pin 334 is fixed to the body 333 via an insulating sheet 336 by means of a cover 335, and a lead wire 337 is led from the detection pin 334.

This lead wire 337 is connected to a point a between resistors $R_1$ and $R_2$ that are connected in series. A predetermined DC voltage V (e.g., 12 V) is applied across these resistors $R_1$, $R_2$, and the body 333 is grounded.

Referring now to the timing chart shown in FIG. 12, a description will be given of the operation of the valves 31-37 thus arranged.

Figure 12A:
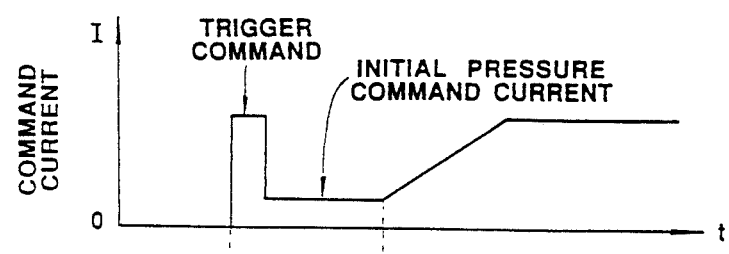
FIG. 12(a)–(c) is a timing chart explaining the operation of the clutch oil pressure controlling valve.
Figure 12B:
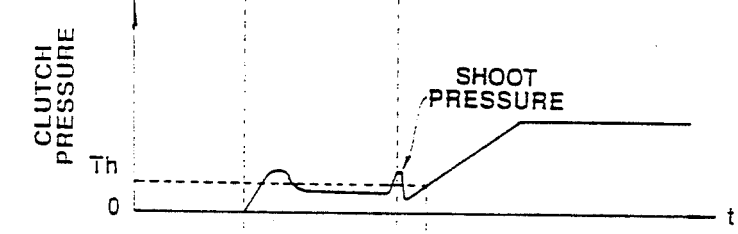
Figure 12C:
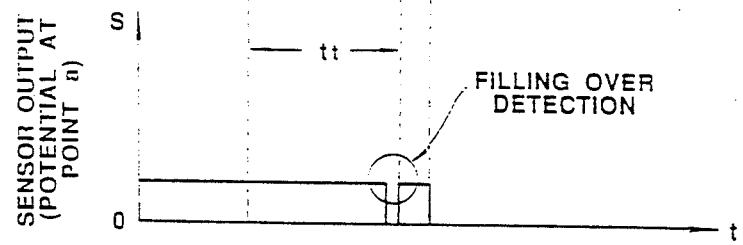

In FIG. 12, the part (a) shows a command current I from the controller 10, the part (b) the oil pressure (clutch pressure) of the oil chamber 328, and the part (c) an output of the sensor 303.

When an attempt is made to engage the clutch, the controller 10 inputs a trigger command to the solenoid 316 of a relevant clutch oil pressure control valve, and the command current I is then made to drop to a predetermined initial pressure command current corresponding to the initial pressure of the clutch oil pressure. In this state, the operation is set in a standby state until completion of the filling (see the part (a) of FIG. 12).

Upon receiving the aforementioned trigger command, the spool 315 of the pressure control valve 301 moves leftward, and the oil from the pump flows into the oil chamber 327 of the flow-rate detection valve 302 via the input port 310 and the oil passage 322. The oil which has entered the oil chamber 327 flows into the oil chamber 328 via the orifice 330 and then flows into the clutch via the output port 311. At this time, since differential pressure occurs between the oil chambers 327 and 328 by means of the orifice, the spool 325 moves leftward.

As a result, the flow-rate detection valve 302 is opened, and the oil from the pump which has entered an oil passage 329 flows into the oil chamber 327 via the oil chamber 326 and then flows into the clutch via the orifice 330, the oil chamber 328, and the output port 311. The flow of oil continues until the clutch pack is filled with the oil.

Here, when the spool 325 is in its neutral position shown in FIG. 10, and the spool 325 is in the period of a filling time $t_f$ when it is moved leftward from the neutral position, the spool 325 is spaced apart from the detecting pin 334.

For this reason, in this state, the potential at the point a is one in which the voltage V is divided by the resistors $R_1$, $R_2$, as shown in the part (c) of FIG. 12.

When the clutch pack is filled with oil, the filling is completed, and the oil no longer flows to it, so that the differential pressure on opposite sides of the orifice 330 disappears.

Accordingly, the spool 325 moves rightward by means of a force in which a force attributable to a difference in the pressure receiving areas of the spool 325 $(A_1+A_3-A_2)$ is added to the returning force of the spring 331.

At the time when the spool 325 returns, the oil pressure from the pump is applied to the clutch oil pressure via the oil passage 329, the oil chamber 327, the orifice 330, the oil chamber 328, and the like. As a result, an overshoot pressure such as the one shown in the part (b) of FIG. 12 is produced.

Here, the spring constant of the spring 332 has been set to a pressure Th smaller than the aforementioned overshoot pressure, as shown in the part (b) of FIG. 12.

Accordingly, during this returning operation, after moving rightward to its neutral position, as shown in FIG. 11, the spool 325 further moves rightward by overcoming the urging force of the spring 332 by means of the shoot pressure, with the result that its right end face abuts against the pin 334.

Consequently, the detection pin 334 is made conductive with the body 333 grounded via the spool 325, so that the potential at the point a drops to zero, as shown in the part (c) of FIG. 12, and no voltage appears at the point a.

This potential at the point a has been input to the controller 10, so that the controller 10 determines the completion of filling on the basis of the fall of the potential at the point a. Immediately upon determining the completion of filling, the controller 10 gradually increases the command current I with respect to the relevant clutch from the value of the initial pressure command current (the part (a) of FIG. 12).

As a result, as shown in the part (b) of FIG. 12, after the pressure of that clutch has fallen from the value of the aforementioned overshoot pressure to the initial pressure, the clutch pressure is increased gradually. Hence, the spool 325 moves temporarily leftward toward the neutral position from the state in which it abuts against the pin 334. Subsequently, since the clutch pressure is increased gradually, the clutch pressure exceeds the set pressure Th of the spring 332 at a certain point of time. As a result, the spool 325 moves rightward again by overcoming the urging force of the spring 332, and its right end face abuts against the detection pin 334.

Hence, the potential at the point a falls again to zero and this zero level is subsequently maintained.

In other words, since the potential at the point a is set to zero when a pressure exceeding the set pressure Th is built in the clutch, while that potential is set to a predetermined voltage value when the clutch pressure is less than the set pressure Th, by monitoring this potential at the point a the controller 10 is capable of not only detecting the completion of filling but also ascertaining the presence or absence of the clutch pressure, i.e., the state of engagement of the clutch.

Figure 2:
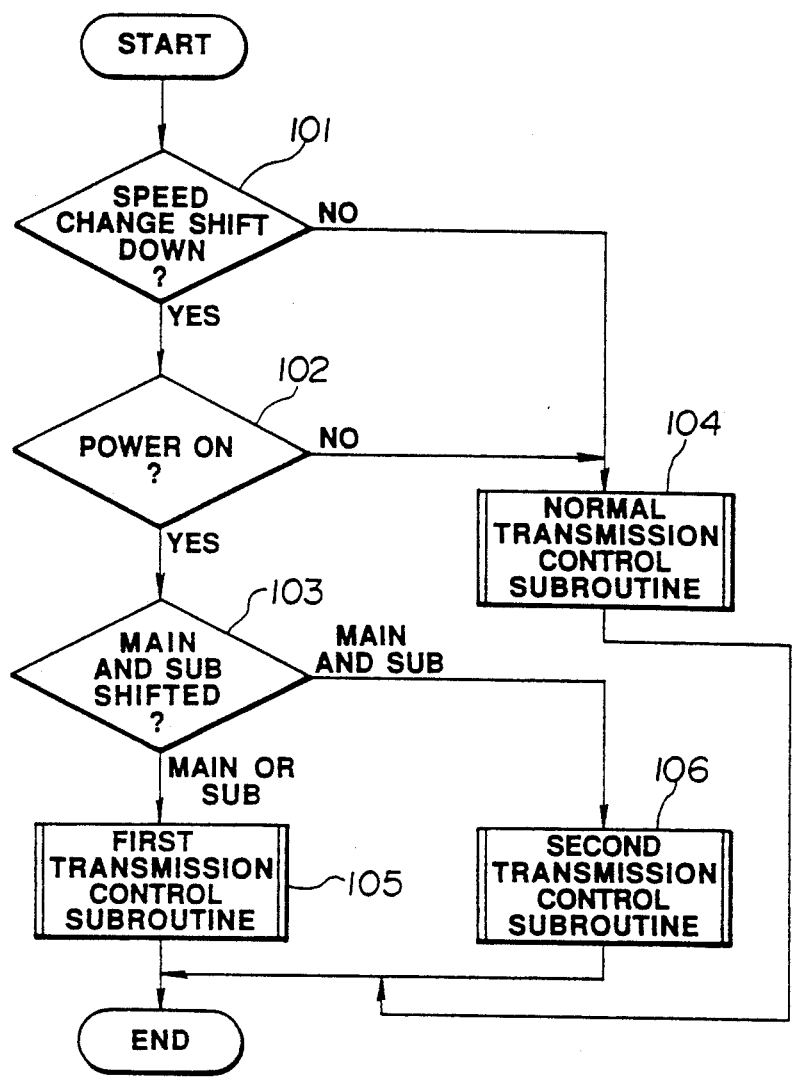
FIGS. 2 to 5 are flowcharts illustrating processing procedures that are executed within a controller shown in FIG. 1.
Figure 3:
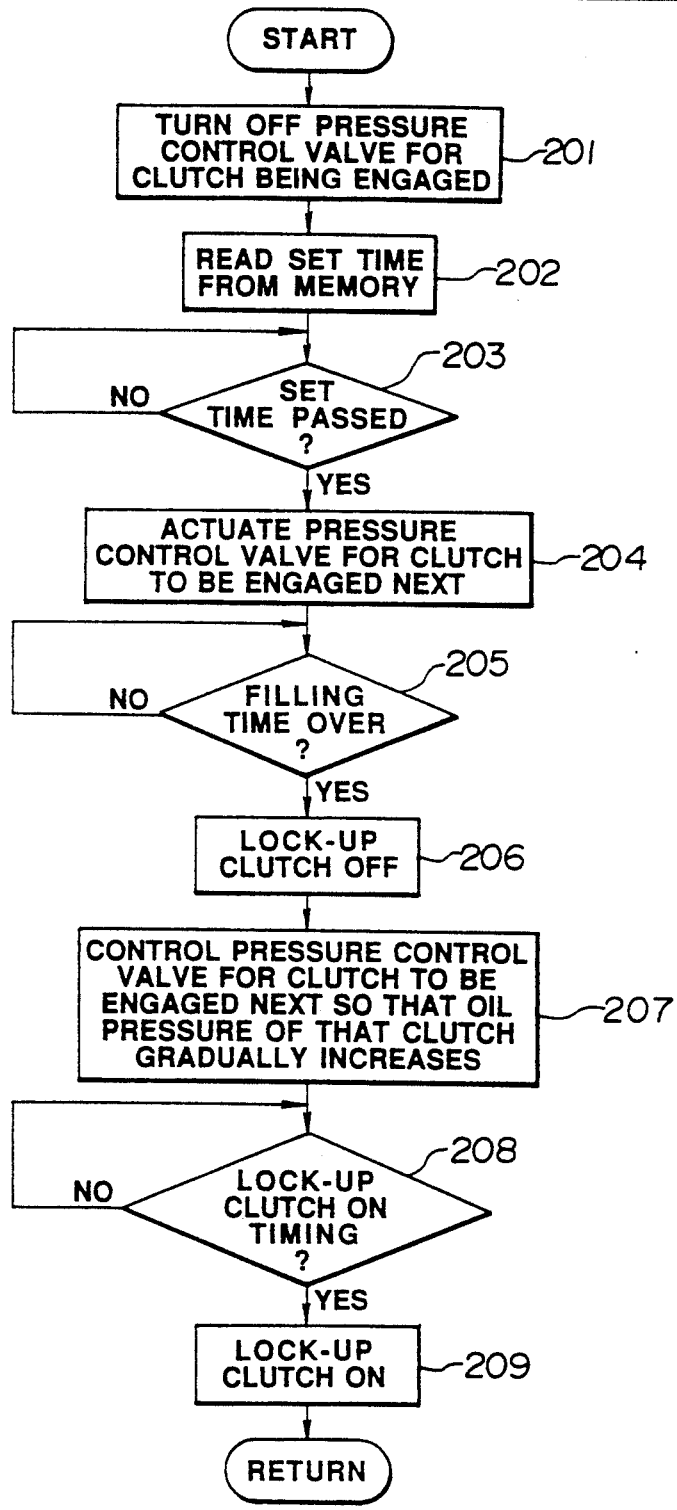

Referring now to the flowcharts shown in FIGS. 2 to 4, a description will be given of the speed change control by the controller 10 having the above-described configuration.

As described before, the controller 10 determines on the basis of outputs of the revolution sensor 7 and the throttle amount sensor 11 whether or not a speed change is to be effected. Thus the controller 10 discriminates whether a downshift is to be effected (Step 101), and whether the present state is that of power on (Step 102). As for this discrimination, the state of power on is discriminated when, for instance, the throttle signal is more than a reference value. Then, when the state for effecting a downshift with power on is detected, a determination is made (Step 103) as to whether or not both the main transmission and the sub transmission have been changed over as the speed change. If only either one of the main transmission and the sub transmission has been changed over, a first subroutine for transmission control shown in FIG. 3 is executed (Step 105). Meanwhile, if both have been changed over, a second subroutine for transmission control shown in FIG. 4 is executed (Step 106). Parenthetically, if it is determined in the aforementioned Step 101 that it is the case of an upshift, or if it is determined in the aforementioned Step 102 that it is not the power on state. i.e., if it is determined that it is not a downshift with power on, then an ordinary routine for transmission control, which is different from the purport of the present invention, is executed, and the speed change is completed (Step 104).

Now, if it is determined in Step 103 that only either one of the main transmission and the sub transmission has been changed over, it is assumed that, for instance, the sub transmission clutch L and the main transmission clutch 2nd are presently being engaged and the speed stage F2 has been selected, and the case of a downshift from F2 to F1 is assumed. At the speed stage F1, the main transmission clutch 1st is engaged (refer to the aforementioned Table 1).

In this case, the first subroutine for transmission control is executed. As shown in FIG. 3, upon the starting of the speed change, the controller 10 first executes processing for turning off the valve 34 connected to the main transmission clutch 2nd being then engaged (at a timing $t_0$ in FIG. 6, Step 201). Then, processing for reading from an unillustrated memory in the controller 10 a time $T_0$ from the timing $t_0$ until a timing $t_1$ when the supply of pressure oil to the valve 33 of the main transmission clutch 1st to be engaged next is commenced.

Here, a description will be given of the time $T_0$ stored in the memory. In a case where the supply of pressure oil to the post-speed-change clutch 1st is commenced at the timing $t_1$ at which the time $T_0$ has elapsed from the timing $t_0$ when the load on the Oil pressure at the pre-speed-changing clutch 2nd has zero, then this time $T_0$ is a time which is set so that the relative number of revolutions, Vc, of the post-speed-change clutch 1st becomes zero at a timing $t_2$ when a filling time $T_1$ has elapsed.

More specifically, optimum set times $T_0, \ldots, \ldots$, ($= t_1 - t_0$) at which the relative number of revolutions becomes zero upon the completion of the filling time are determined in advance through simulations and experiments (actual vehicle tests etc.) by using various speed stages and engine power (throttle openings) as parameters. These set times $T_0, \ldots, \ldots$ are stored in the aforementioned memory in the controller 10 in the form of a map. Accordingly, at the time of a speed change, when the set time $T_0$ corresponding to the output of the throttle amount sensor 11 and the speed stage of the present case is read from this memory, and when a pressure control valve concerning a clutch to be engaged next is actuated to supply the pressure oil at the timing $t_1$ when this set time $T_0$ has elapsed, then the relative number of revolutions of the clutch to be engaged next becomes zero at the point of time when the filing time $T_1$ ($= t_2 - t_1$) has elapsed (this fact has been confirmed through the aforementioned simulations and the like). It should be noted that the output of the throttle amount sensor 11 may be used for the detection of engine power, and in cases where the output shaft torque of the engine can be detected with a torque sensor or the like, the detection value may be used.

Thus when the set time $T_0$ corresponding to the speed change (F2→F1) of the present case and the output of the throttle amount sensor 11 is read from the memory (Step 202), a determination is consecutively made by an unillustrated timer as to whether or not the set time $T_0$ has elapsed (Step 203). Then, the supply of pressure oil to the pressure control valve 33 of the main transmission clutch 1st to be engaged next is commenced at the timing $t_1$ when the aforementioned time $T_0$ has elapsed (see the part (d) of FIG. 6, Step 204).

Subsequently, the controller 10 confirms the completion of filling on the basis of an output $e_3$ of the filling detection sensor 303 of the valve 33 connected to the aforementioned main transmission clutch 1st (Step 205), and executes the following two items of control (a) and (b) at the point of time (at the timing $t_2$ in FIG. 6) when the aforementioned filling completion detection signal is inputted from the sensor 303.

a) The pressure control valve of the lock-up clutch 6 is turned off (the part (e) of FIG. 6, Step 206).
b) The oil pressure of the main transmission clutch 1st for which the aforementioned completion of filling has been detected is gradually increased with a predetermined buildup rate (the part (d) of FIG. 6, Step 207).

Upon completion of this control, at a timing $t_3$ when a predetermined time (hereinafter referred to as the lock-up clutch delay time) T3 has elapsed from the timing $t_2$ (Step 208), the controller 10 starts to build up the oil pressure of the lock-up clutch 6.

When the above-described speed-change control is effected, the relative number of revolutions, Vc, of the post-speed-changing clutch 1st becomes zero at the timing $t_2$ when the torque off time $T_2$ of that clutch 1st has elapsed, as shown in the part (b) of FIG. 6. Subsequently, as for the clutch 1st, engagement is effected in a state in which the numbers of revolutions of the two rotating bodies are synchronized, so that negative torque due to the engagement load is not produced, as shown in the part (a) of the drawing. Accordingly, the operator does not feel a sense of deceleration (discomfort) due to it.

Meanwhile, if it is determined in the aforementioned Step 103 that both the main transmission and the sub transmission have been changed over, it is assumed that, for instance, the sub transmission clutch L and the main transmission clutch 3rd are being engaged and the speed stage F4 has been selected, and the case of a downshift from F4 to F3 is assumed. At the speed stage F3, the sub transmission clutch H and the main transmission clutch 2nd are engaged (refer to the aforementioned Table 1).

In this case, the second subroutine for transmission control is executed. As shown in FIG. 4, upon the starting of the speed change, the controller 10 first executes processing for turning off the valves 31, 37 respectively connected to the sub transmission clutch L and the main transmission clutch 3rd being then engaged (at a timing $t_0'$ in FIG. 7, Step 401). Then, at this timing $t_0'$, the supply of pressure oil to the valve 32 of the clutch H to be engaged next is commenced with respect to the sub transmission side only (Step 402). Subsequently, at the point of time when the completion of filling is confirmed on the basis of an output $e_2$ of the filling detection sensor 303 of the valve 32 of the post speed-changing clutch H (Step 403), the oil pressure of the post-speed-changing clutch H is gradually increased with a predetermined buildup rate (the part (f) of FIG. 7, Step 404).

Then, processing similar to that of Steps 202–209 of the aforementioned first subroutine for transmission control is executed with respect to the main transmission-side clutch 2nd to be engaged next (and with respect to the lock-up clutch 6).

That is, an appropriate set time $T_0'$ corresponding to the output of the throttle amount sensor 11 and the speed stage of the present case is read from the memory in the controller 10 (Step 202), and at a timing $t_1'$ when that set time $T_0'$ has elapsed as shown in FIG. 7 (Step 203) the valve 34 of the main transmission clutch 2nd to be engaged next is actuated so as to supply pressure oil thereto (Step 204). Upon confirming the completion of a filling time $T_1'$ ($t_2'-t_1'$) for the main transmission clutch 2nd (Step 205), at the timing $t_2'$ when a filling completion detection signal $e_4$ is inputted, the lock-up clutch 6 is set to off (Step 206), and the oil pressure of the main transmission clutch 2nd is gradually increased with a predetermined buildup rate (Step 207).

Subsequently, at a timing $t_3'$ when the lock-up clutch delay time $T_3'$ has elapsed from that timing $t_2'$ (Step 208), the buildup of the oil pressure of the lock-up clutch 6 is commenced (Step 209).

In this second subroutine for transmission control, with respect to a sub transmission clutch, at the point of time when the oil pressure of the pre-speed-change clutch L is set to zero (clutch released), pressure oil is supplied immediately to the post-speed-change clutch H, and the engagement of the post-speed-changing clutch H is completed within the torque off time $T_2'$ of the main transmission clutch. During the engagement of the sub transmission H, torque fluctuations due to engagement load occur in the clutch H. At the time of the occurrence of these torque fluctuations, however, they do not appear at the output shaft of the transmission in which the main transmission side is in the period of torque off period. Moreover, at a timing $t_4$ (see the part (e) of FIG. 7) when the relative number of revolutions of the sub transmission clutch H has become zero, the state becomes similar to that of the timing to shown in FIG. 6, i.e., the state becomes one in which the engagement is to be effected with respect to the main transmission-side post-speed-changing clutch (2nd) only. For this reason, if a similar procedure to that of the first subroutine for transmission control is subsequently executed for the post-speed-changing clutch 2nd, and if the supply of pressure oil to the clutch 2nd is commenced at the timing (timing $t_1'$) of completion of the filling time at the point of time when the relative number of revolutions of the post-speed-changing clutch 2nd becomes zero, then negative torque is not produced at the output shaft of the transmission in a similar manner.

In the embodiment, as shown in FIG. 6 or 7, the lock-up clutch 6 is set in an engaged state during the period of the torque off time $T_2$ or $T_2'$. Thus, as the input end shaft of the transmission is directly coupled with the output shaft of the engine, the number of revolutions of a turbine of the torque converter 2 increases sharply, i.e., the rotating side rotating body on the input side of the post-speed-changing clutch increases quickly. Accordingly, an effect is obtained in that the timing for setting the relative number of revolutions of the post-speed-changing clutch to zero can be quickened.

In addition, in accordance with the embodiment, at the time of engagement of the post-speed-changing clutch, an arrangement is provided for alleviating load on clutch engagement by providing the lock-up clutch delay time $T_3$ or $T_3'$ with respect to the lock-up clutch 6.

It should be noted that when the oil pressure of the post-speed-changing clutch is gradually increased subsequent to the point of time when the filling time was completed, if the relative number of revolutions of that clutch is zero at that point of time, the initial pressure and the rate of gradual increase of oil pressure subsequent to the filling time may be fixed. In practice, however, there are cases where the relative number of revolutions deviates from zero at the completion of the filling time. For that reason, in implementing the embodiment, the aforementioned initial value and the rate of gradual increase of oil pressure may be varied in correspondence with the throttle amount and the speed stage of the present case in the same way as the aforementioned set time $T_0$ or $T_0'$ in order to alleviate a speed-change shock caused by that deviation.

In addition, it is effective to set the initial pressure of the post-speed-changing clutch at a low level in reducing the speed-change shock, since the torque of the output shaft of the transmission needs to rise from zero.

In this embodiment, the supply of pressure oil to the post-speed-changing clutch is commenced at the point of time when a set time obtained in advance through simulations and the like has elapsed, but it is possible to implement the embodiment as follows:

A set relative number of revolutions, Vco, is read from the memory. By the relative number of revolutions, Vco, is meant a value which is obtained in advance as an optimum one through simulations and the like, and it is a number of revolutions in which the relative number of revolutions becomes zero at the completion of the filling time in cases where the supply of pressure oil to the post-speed-changing clutch is commenced at the point of time when the relative number of revolutions of the post-speed-changing clutch has reached the relative number of revolutions, Vco. Set relative numbers of revolutions, Vco, . . . , . . . are also stored in the memory in the form of a map in correspondence with each speed stage and engine power in the same way as the aforementioned set times T₀, . . . , . . .

Accordingly, the set relative number of revolutions, Vco, corresponding to the output of the throttle amount sensor 11 and the speed stage of the present case is read from the memory (Step 202').

The relative number of revolutions of the post-speed-changing clutch is consecutively detected, and a determination is made as to whether or not the relative number of revolutions detected has reached the set relative number of revolutions, Vco, read (Step 203').

Then, at a timing $t_1''$ when the relative number of revolutions detected has reached the set relative number of revolutions, Vco, as shown in FIG. 8, pressure oil is supplied to the post-speed-changing clutch (Step 204), and the oil pressure of the post-speed-changing clutch is gradually increased at a timing $t_2''$ of completion of the filling time (Steps 205, 207). With respect to the lock-up clutch 6 as well, processing (Steps 206, 208, 209) similar to the above-described one is executed.

When the above-described control is effected, it is possible to obtain a similar effect to that of the above-described embodiment. Furthermore, in accordance with this modification, an advantage is obtained in that the timing when the relative number of revolutions of the post-speed-changing clutch and the timing of completion of the filling time of that clutch can be made to coincide with each other with good accuracy.

It should be noted that in the foregoing embodiment, during the lock-up clutch delay time, the oil pressure of the lock-up clutch 6 is completely set to zero, with the result that, at the completion of engagement of that clutch 6, a speed-change shock occurs as shown in the part (a) of FIG. 6, the part (a) of FIG. 7, and the part (a) of FIG. 8.

Accordingly, in order to reduce the shock occurring at the time of engagement of the lock-up clutch 6, it is possible to implement the embodiment such that, during engagement of the post-speed-changing clutch, the oil pressure of the lock-up clutch 6 is not completely set to zero but is maintained at a pressure level slightly higher than the internal pressure of the torque converter 2, as shown in the part (e) of FIG. 9. In cases where a predetermined oil pressure is thus maintained while the oil pressure of the lock-up clutch 6 is lowered, the engagement of the clutch 6 is completed with the transmitting torque of the lock-up clutch 6 lowered, so that it is possible to reduce or overcome the shock at the time of engagement, as shown in the part (a) of FIG. 9. Moreover, at the same time, it is possible to reduce the engagement load acting on the post-speed-changing clutch. It should be noted that although in the embodiment a plurality of set times or set relative numbers of revolutions both corresponding to each speed stage and engine power are prepared, it is possible to uniformly set a set time or a set relative number of revolutions regardless of the speed stage or engine power and use the same in an actual implementation.

Although in the first subroutine for transmission control of the embodiment a description has been given of the case of F2→F1, a similar effect can be obtained with respect to the cases of F3→F2, F5→F4, and F7→F6 for effecting a speed change for one side of the transmission by carrying out similar processing.

In addition, with respect to the second subroutine for transmission control as well, a similar effect can be obtained in the case of not only F4→F3 but F6→F5 by carrying out similar processing to that of the embodiment.

Next, a description will be given of a second embodiment of the present invention.

The speed-change shock of a gear transmission is evaluated by a jerk value J which is defined by the following formula:

$$J = \frac{d\alpha}{dt} = K \frac{G}{I} \cdot \left( \mu \frac{dp}{dt} + P \frac{d\mu}{dt} \right) \quad (1)$$

Where
J: jerk value
α: acceleration of the vehicle
K: coefficient of transformation
G: constant of the reduction ratio
I: vehicle total weight (body weight + cargo weight)
μ: coefficient of friction of the clutch disk
P: oil pressure of the clutch The aforementioned constant of the reduction ratio, G, is determined on the basis of each reduction speed stage, but also includes a coefficient suggesting the number of laminated layers of a clutch plate and its area in each speed stage. Accordingly, the value of this constant G varies slightly depending on the speed stage.

It goes without saying that G becomes the reduction ratio itself in cases where the numbers of the laminated layers of the clutch plates and their areas are equal for the respective speed stages.

The second term in the parentheses of the aforementioned Formula (1) is an expression having a bearing when the difference between static friction and dynamic friction is large, and its effect appears at the completion of engagement of the clutch. In case where there is no difference between the two, it can be ignored. In the below, a description will be given on an assumption that the first term is valid.

The jerk value J in the above formula (1) can be expressed as $$J = K \frac{G}{I} \mu \frac{dp}{dt} \quad (1)'$$

Here, if it is assumed that $$K' = K \cdot \frac{G}{I} \cdot \mu \quad (2)$$

then the above Formula (1)' is expressed as $$\frac{dp}{dt} = \frac{J}{K'} \quad (3)$$

Thus, an oil pressure increase rate dp/dt of the clutch is determined by K' and the jerk value J (a rate of change in acceleration) that are determined by the conditions at the time of the speed change.

Here, since the parameters K, G of K' are determined by the various conditions of the clutch and the reduction ratio, if the vehicle total weight I and the coefficient of dynamic friction μ are assumed to be constant, K' can be determined unconditionally from the manner of speed change, i.e., the difference between the upshift and downshift and the speed stage at the time of the speed change.

Figure 14:
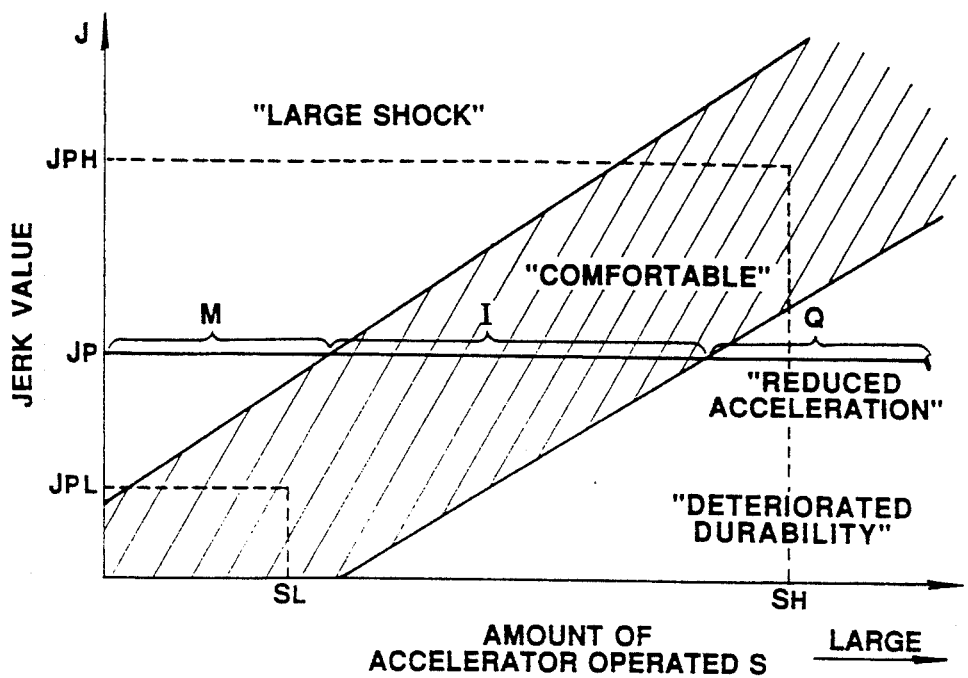
FIG. 14 is a graph conceptually illustrating the relationships between an amount of an accelerator operated, a jerk value J, and an operator sensitivity evaluation value.

If the parameter of an amount of an accelerator operated is added to the operator's sensitivity evaluation value, the relationship between the amount of accelerator operated, the jerk value J, and the sensitivity evaluation value becomes such as the one shown in FIG. 14.

As is apparent from the drawing, in cases where a targeted jerk value $J_p$ is set uniformly without taking the magnitude of the amount of the accelerator operated, and a speed-changing clutch is engaged at a corresponding pressure increase rate dp/dt, then the operator feels "comfortable" in the section I (where the amount of the accelerator operated is partial), but feels "the speed-change shock is large" in the section M (where the amount of the accelerator operator is small). In addition, the operator feels a "sense of reduced acceleration" in the section Q, and in conjunction with it there occurs the drawback of a reduction in the durability of speed-changing clutches.

For that reason, in this apparatus, when the amount of the accelerator operated, S, is a low value $S_L$, the jerk value J is set to a small targeted jerk value $J_{PL}$, while when the amount of the accelerator operated, S, is a low value $S_H$, the jerk value J is set to a high targeted jerk value $J_{PH}$. That is, by setting the pressure increase rate dp/dt corresponding to the amount of the accelerator operated such that the greater the amount of the accelerator operated, the greater the targeted jerk value, i.e., the rate of change in the vehicle acceleration becomes, an attempt is made to constantly obtain the sensitivity evaluation value of "comfortable", and the durability of clutches improves.

It should be noted that K, in the above Formula (2) has the following tendency:

The higher the speed stage after the speed change, the smaller the value K becomes.

Hence, according to the above Formula (3), it suffices if the higher the speed stage after the speed change, the higher the oil pressure increase rate dp/dt is set.

At the time of operation of the brake, the engine is placed under a high load, so that there is the possibility of the clutches being damaged by thermal load at the time when the speed-changing clutch is engaged. To obviate this, in this apparatus, when the brake is being operated, the speed-changing clutch is engaged during a speed change by setting the pressure increase rate at a high level (at the level of a pressure increase rate corresponding to a substantially maximum value of the amount of the accelerator operated (slightly lower than the maximum value)). That is, at the time when the brake is being operated, the clutch is engaged with a high pressure increase rate dp/dt regardless of the amount of the accelerator operated.

Figure 4:
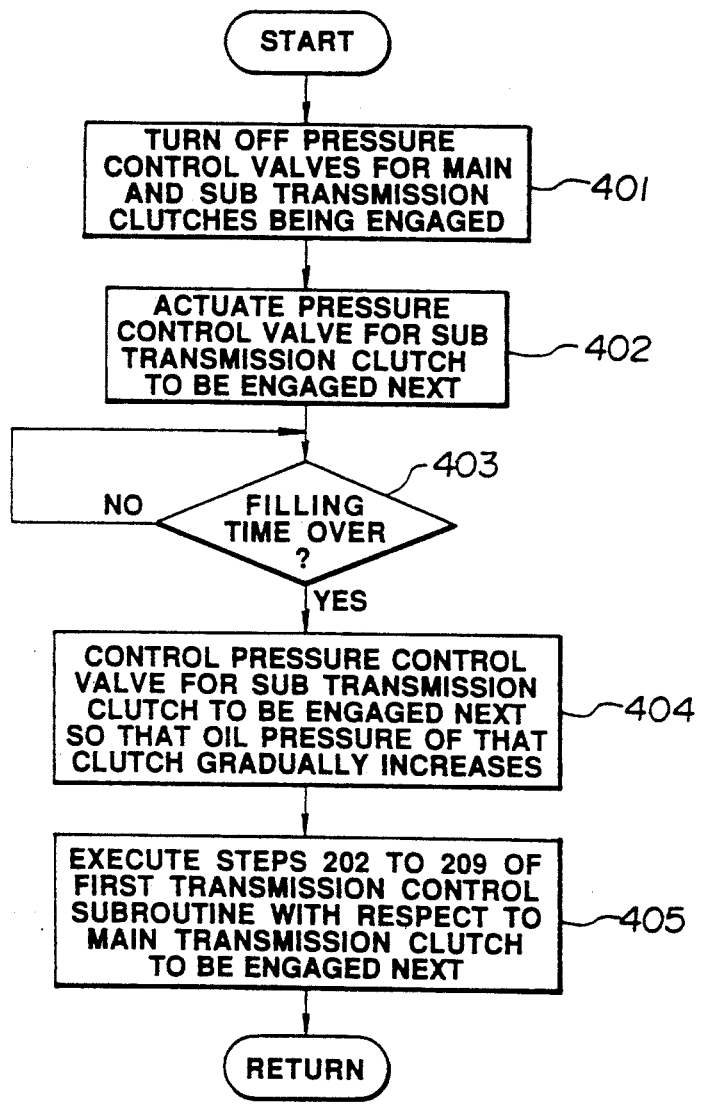

To execute the above-described control of the gradual increase of oil pressure, patterns of an optimum gradual increase in the clutch oil pressure are stored in the memory (not shown) inside the controller 10 shown in FIG. 1 in correspondence with the amount of the accelerator operated and a combination of the state of operation of the brake and various speed-change modes, as shown in FIG. 4.

More specifically, an explanation will be given by citing the case of one speed-change mode "upshift, F1→F2". Patterns of a gradual increase in oil pressure, PT1, PT2, PT3, PT4, PT5, in which the greater the amount of pressing, the higher the oil pressure gradual increase rate dp/dt are stored in correspondence with detection values S1–S5 of the throttle amount sensor 11 (see FIG. 15). In addition, also stored is a pattern of a gradual increase in oil pressure, PT6, for engaging the clutch at an oil pressure increase rate dp/dt which is slightly lower than an oil pressure increase rate dp/dt corresponding to a full throttle state (S5) in correspondence with a case where the operation of the brake is detected by the brake sensor 12 (brake on).

These patterns of a gradual increase in oil pressure which vary according to the magnitude of the amount of the accelerator operated are stored in the memory so that the clutch will be engaged at a higher oil pressure increase rate dp/dt at a higher speed stage with respect to each speed change mode.

Referring now to the flowchart shown in FIG. 5 and the timing chart shown in FIG. 17, a description will be given of the speed change control by the controller 10 having the above-described configuration.

The controller 10 determines on the basis of outputs of the revolution sensor 7 and the throttle amount sensor 11 whether or not a speed change is to be effected. Simultaneously with this determination, a discrimination is made between an upshift and a downshift (Step 501).

Now, it is assumed that the clutch L and the clutch 1st are being engaged and the speed stage F1 (Forward 1st) has been selected, and that an upshift from F1 (Forward 1st) to F2 (Forward 2nd) is to be carried out. In the speed stage F2, the clutch 2nd is engaged (see the Table 1 above).

Upon starting of the speed change, the controller 10 first commences the supply of pressure oil to the clutch oil pressure control valve 34 of the speed-changing clutch 2nd (Step 102, timing $t_0$ in FIG. 6).

Figure 17A:
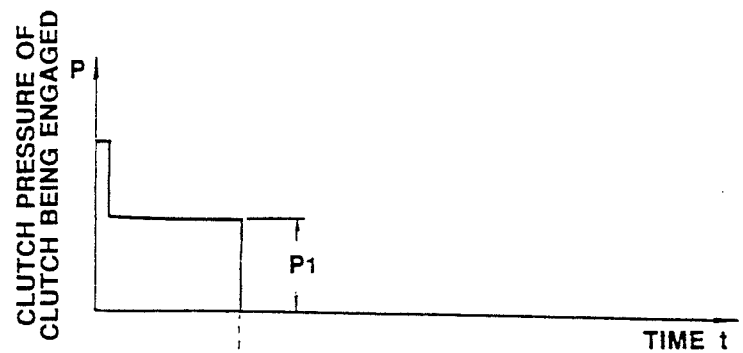
FIG. 17(a)-(b) is a timing chart illustrating the manner in which the pressure of a speed-changing clutch undergoes a change accompanying the execution of the flowchart shown in FIG. 5.
Figure 17B:
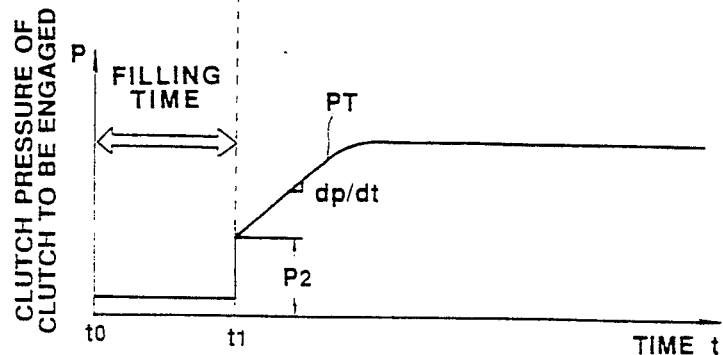

Subsequently, on the basis of an output of the filling detection sensor attached the valve 34 connected to the post-speed-changing clutch 2nd, the controller 10 confirms the completion of filling (Step 105), and executes the following control at the timing (timing $t_1$ in FIG. 17) when the filling completion detection signal $e_4$ is inputted from this sensor:

The valve 33 of the pre-speed-changing clutch 1st being engaged is turned off (Step 507, part (a) of FIG. 17).

The oil pressure of the post-speed-changing clutch 2nd for which the filling completion has been detected is gradually increased with an oil pressure gradual pattern PT which will be described later (Step 511, part (b) of FIG. 17).

Here, in the control of the aforementioned Steps 507, 511, an attempt is made to prevent a speed-change shock by setting to appropriate values the oil pressure $P_1$ (see the part (a) of FIG. 17) of the clutch 1st to be set to off and the oil pressure $P_2$ (see the part (b) of FIG. 17) of the clutch 2nd to be set to on so that the output shaft torque of the transmission 3 will become equal immediately before the speed change and upon completion of the filling.

That is, the speed-change shock occurs due to a difference in the output torque of the transmission 3 immediately before and after the speed change. For this reason, the speed-change shock can be prevented if the speed change is effected in such a manner that this torque difference disappears.

The numbers of revolutions $n_0$, $n_1$ of the input and output shafts of the torque converter 2 shown in FIG. 1 are respectively detected by the sensors. Accordingly, by determining a ratio between these numbers of revolutions, $e = n_1/n_0$, it is possible to calculate a primary coefficient (STP) and a torque ratio (ST) indicating the performance of the torque converter 2. In addition, since the input torque $T_p$ of the torque converter can be expressed as $$Tp = STP \cdot (n_0/1000) \ldots \quad (4)$$

and since the output torque $T_t$ of the torque converter can be expressed as $$T_t = T_p \cdot ST \ldots \quad (5)$$

the value of the output torque $T_t$ of the torque converter can be calculated on the basis of these formulae and the aforementioned coefficient (STP) and torque ratio (ST).

Thus, by determining the output torque $T_t$ of the torque converter at the timing $t_0$ when the aforementioned speed change command is issued, it is possible to determine the torque $T_B$ of the output shaft of the transmission 3 at that timing $t_0$ on the basis of the following formula:

$$T_B = G \cdot T_t \ldots \quad (6)$$

where

G: gear ratio of the transmission 3 as a whole

Meanwhile, the frictional torque $T_c$ of the clutch at the filling completion timing $t_1$ of the clutch 2nd can be expressed as $$T_c = K_c \mu \cdot P \ldots \quad (7)$$

where $K_c$: clutch coefficient at timing $t_1$ $\mu$: frictional coefficient of the clutch at timing $t_1$, and this is a function of the relative rotational speed V of the clutch disk P: clutch oil pressure In addition, this frictional torque $T_c$ can be converted into the output shaft torque $T_A$ of the transmission 3 at the timing $t_1$ on the basis of the following formula (8):

$$\begin{aligned} T_A &= G' \cdot T_c \\ &= K_c \cdot \mu \cdot G' \cdot P \end{aligned} \quad (8)$$

where G': gear ratio between the engaged clutch and the output shaft of the transmission at timing $t_1$ In order to prevent fluctuations of the torque during speed change, it suffices if the transmission output shaft torque $T_B$ at the timing $t_0$ shown in Formula (6) and that torque $T_A$ at the timing $t_1$ shown in Formula (8) become equal. The oil pressure of the engaged clutch which satisfies this condition $T_B = T_A$ can be expressed as follows on the basis of Formula (6) and (8):

$$P = (G \cdot T_t)/(K_c \mu \cdot G') \ldots \quad (9)$$

It should be noted that since the frictional coefficient $\mu$ of the clutch shown in Formula (9) above is a function of the relative number of revolutions of the clutch disk, it is impossible to ascertain the frictional coefficient $\mu$ in advance. However, it is possible to obtain the frictional coefficient $\mu$ since the relative number of revolutions of the disk at the time of the start of speed change can be determined from the number of revolutions $n_1$ detected by the sensor 7, the gear ratio of the transmission before and after the speed change, and the number of revolutions of the output shaft detected by the sensor 9.

Accordingly, the controller 10 calculates the oil pressure $P_2$ to be applied to the post-speed-changing clutch 2nd on the basis of the aforementioned Formula (9) (Step 503), and causes this oil pressure value $P_2$ to act on the 2nd clutch at the timing $t_1$ of completion of the filling time of the clutch 2nd (Step 506).

It should be noted that it suffices if the oil pressure $P_1$ to be applied to the 1st clutch is a value which is capable of maintaining the output torque value during the filling time $t_0$–$t_1$, and this oil pressure value $P_1$ can also be determined in accordance with the aforementioned Formulae (6) and (8). This oil pressure $P_1$ is applied to the clutch 1st during the period of the filling time (Step 504).

Upon completion of the filling time, as for the post speed-changing clutch 2nd, the initial pressure $P_2$ is applied to that clutch 2nd, and its oil pressure is then gradually increased in accordance with the oil pressure gradual pattern PT. In this embodiment, an attempt is made to engage the clutch 2nd so that the operator will not feel a speed-change shock in terms of his or her sense and with an optimum pattern of a gradual increase in oil pressure for improving the durability of the clutches.

Figure 5:
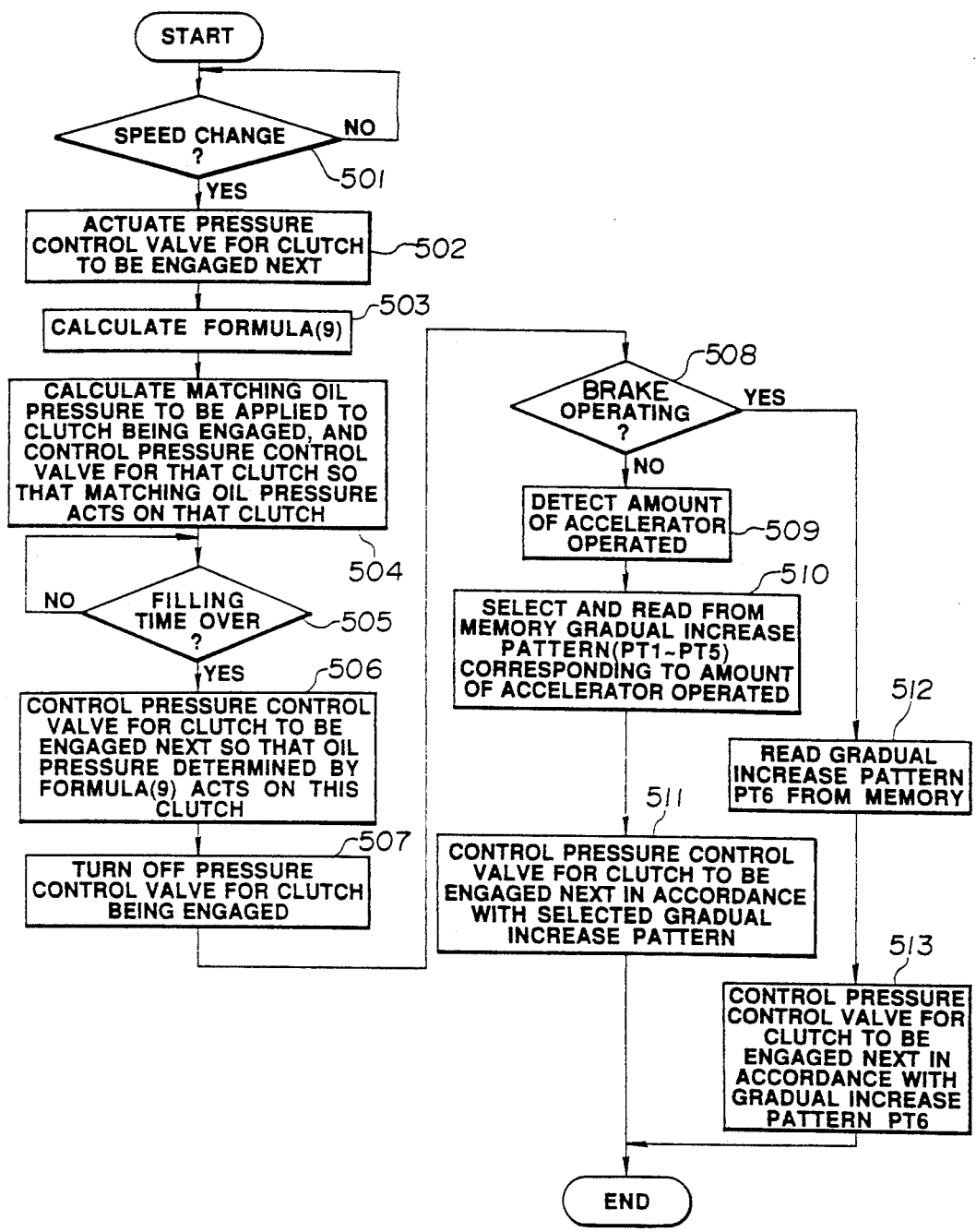
Figure 6A:
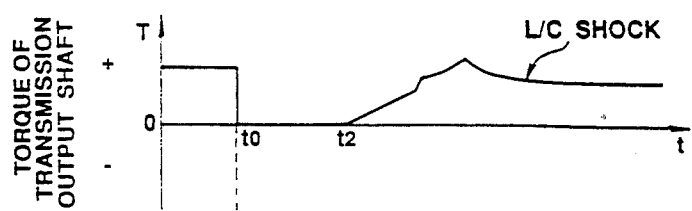
FIG. 6(a)–(e) is a timing chart illustrating the manner of changes in various elements of a transmission system in a case where the flowchart shown in FIG. 3 is executed.
Figure 6B:
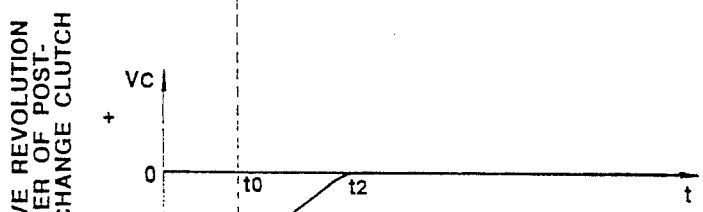
Figure 6C:
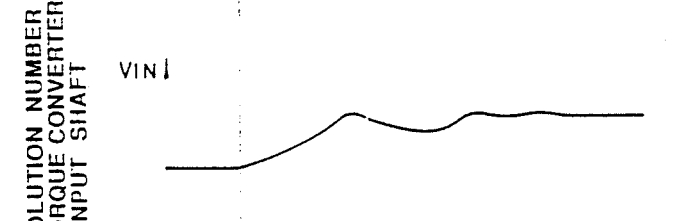
Figure 6D:
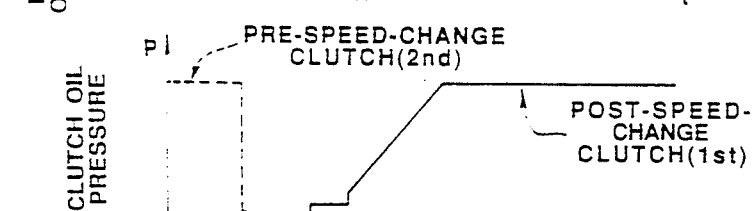
Figure 6E:
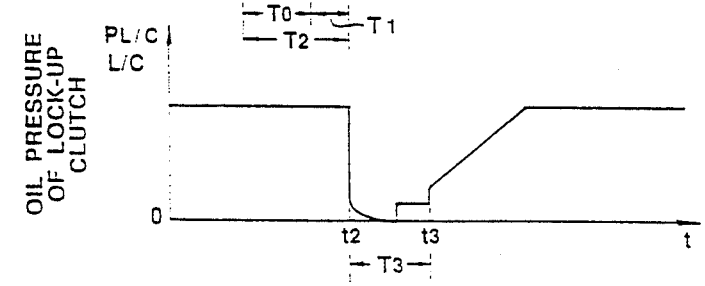
Figure 8A:
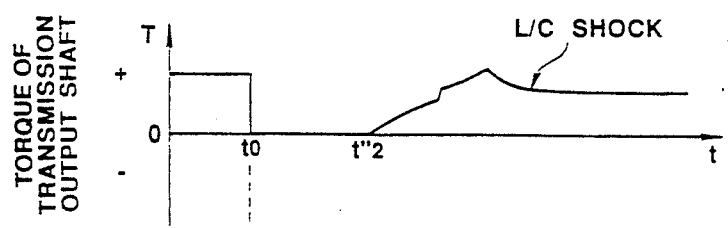
FIGS. 8(a)–(e) and 9(a)–(e) are timing charts illustrating another embodiment of the method in accordance with the present invention.
Figure 8B:
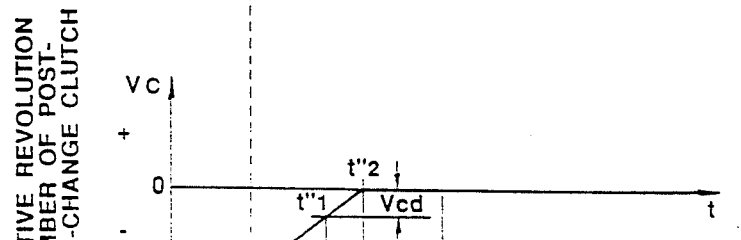
Figure 8C:
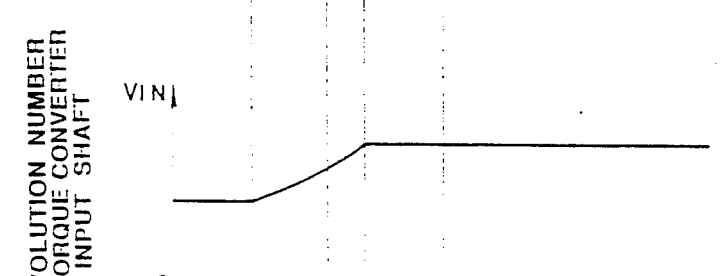
Figure 8D:
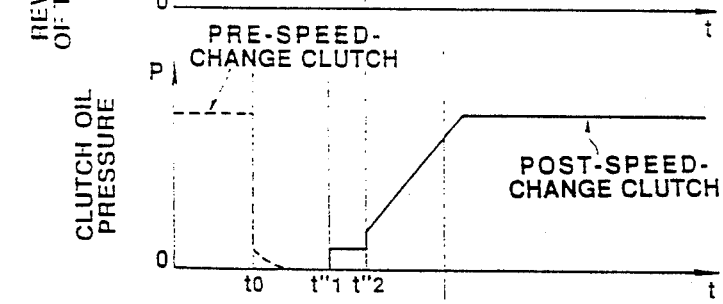
Figure 8E:
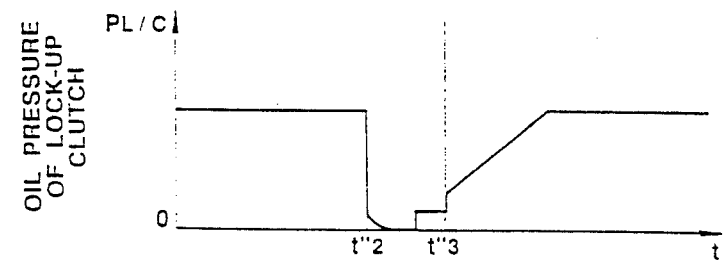
Figure 9A:
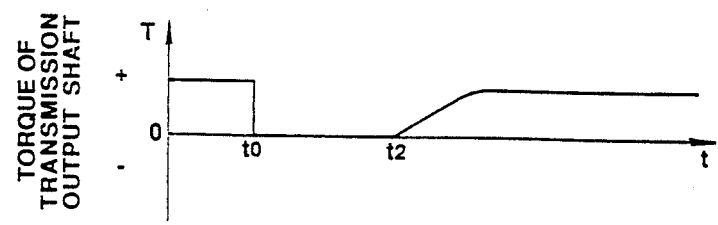
Figure 9B:
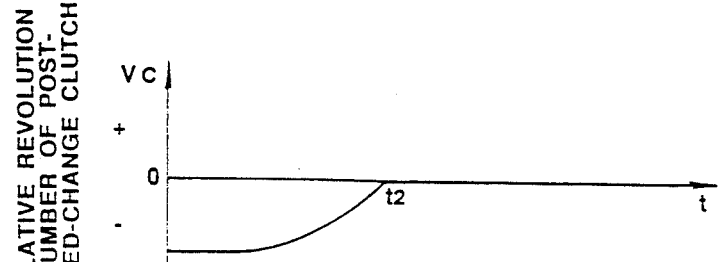
Figure 9C:
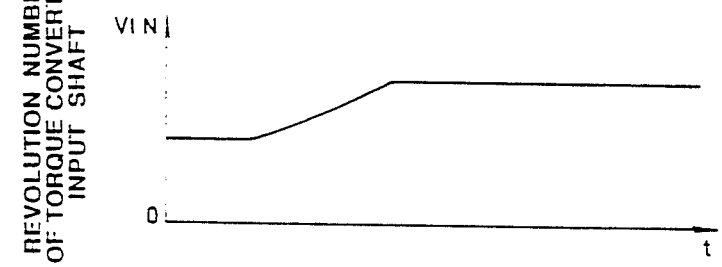
Figure 9D:
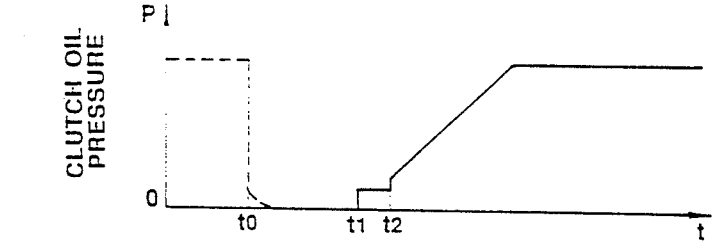
Figure 9E:
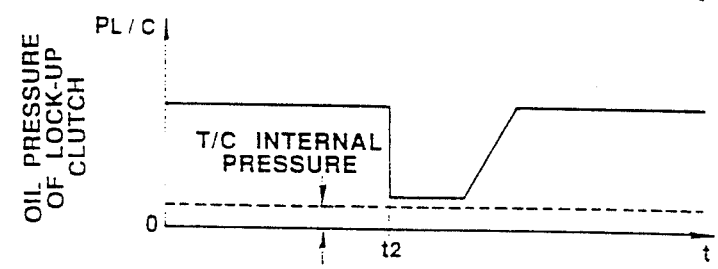
Figure 18:
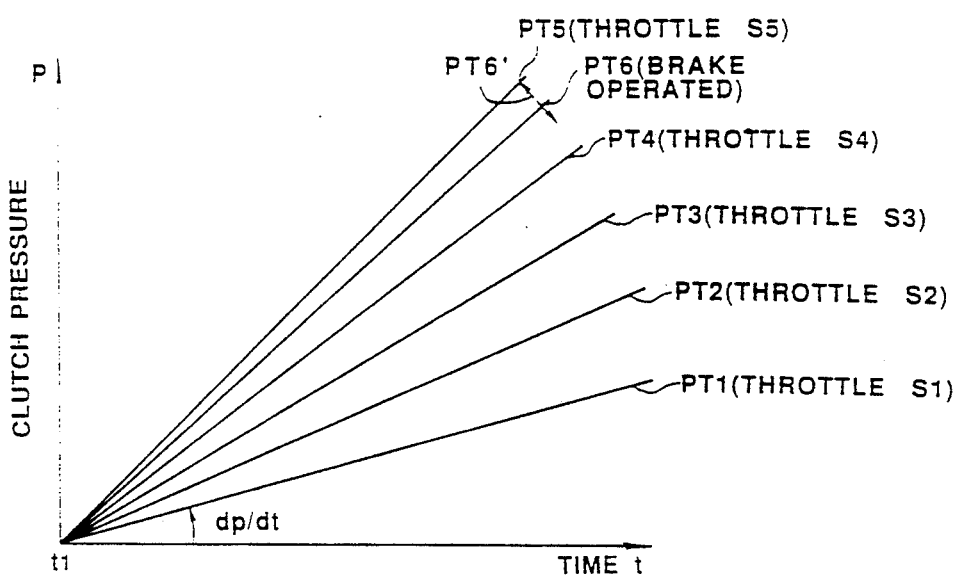
FIG. 18 is a timing chart illustrating the manner in which the clutch pressure is gradually increased after a speed change with gradually increasing patterns stored in the memory shown in FIG. 16.

Namely, in Step 508 shown in FIG. 5, when it is determined on the basis of an output of the sensor 12 that the brake is being operated, the oil pressure gradual increase pattern PT6 is read from the memory incorporated in the controller 10 (Step 512), and the control valve 34 for the post-speed-changing clutch 2nd is actuated by a current command signal according to this pattern. As a result, the oil pressure of the clutch 2nd is gradually increased at the timing $t_1$ of completion of the filling time (Step 513), as shown at PT6 in FIG. 18.

Meanwhile, in Step 508, when it is determined that the brake is not being operated, on the basis of an output of the throttle amount sensor 11 (Step 509), processing is effected in which an oil pressure gradual increase pattern (PT1–PT5) corresponding to the detection value (S1–S5) of the sensor 11 is selected and read from the memory (Step 510). Thus the control valve 34 concerning the speed-changing clutch 2nd is actuated by a current command signal according to the pattern selected. As a result, the oil pressure of the clutch 2nd is gradually increased at the timing $t_1$ of completion of the filling time in correspondence with the patterns PT1–PT5 selected, as shown at PT1–PT5 in FIG. 18 (Step 511).

Figure 19A:
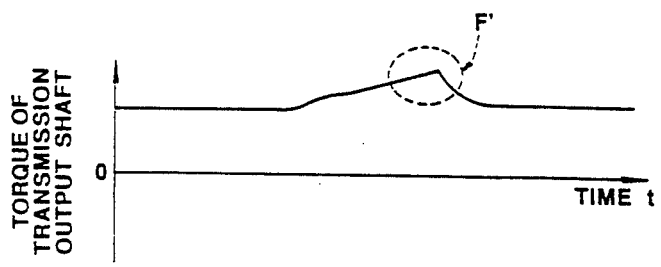
FIGS. 19(a)-(b) and 20(a)-(b) are timing charts illustrating the manner in which elements of the transmission system undergo changes when the flowcharts shown in FIG. 5 is executed.
Figure 19B:
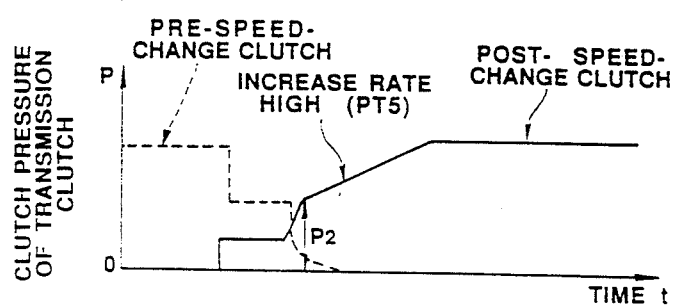

The parts (a) and (b) of FIG. 19 are timing charts respectively illustrating the manner of changes in the torque of the output shaft of the transmission 3 and the pressure of the pre- and post-speed-changing clutches (clutches 1st and 2nd) in cases where the amount of the accelerator operated is large, e.g., where a throttle signal S5 is being outputted from the throttle amount detection sensor 11. The parts (a) and (b) of FIG. 20 are timing charts respectively illustrating the manner of changes in the torque of the output shaft of the transmission 3 and the pressure of the pre- and post-speed-changing clutches (clutches 1st and 2nd) in cases where the amount of the accelerator operated is small, e.g., where a throttle signal S1 is being outputted from the throttle amount detection sensor 11.

As shown in the part (b) of FIG. 19, in cases where the amount of the accelerator operated is large (throttle amount S5), the gradual increase pattern PT5 with a high increase rate is selected, and the post-speed-changing clutch 2nd is engaged with a very short time of engagement in accordance with this pattern PT5.

Parenthetically, in this case, when the amount of the accelerator operated is large, the initial pressure $P_2$ is set to a relatively large value, as shown in FIG. 19.

Figure 20A:
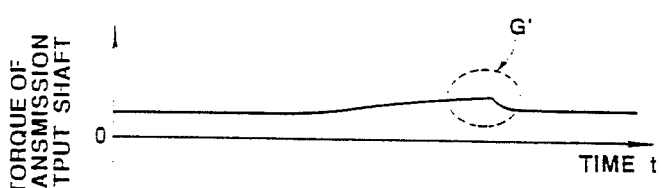
Figure 20B:
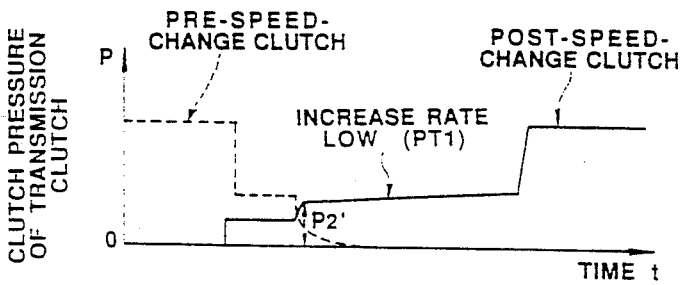
Figure 21A:
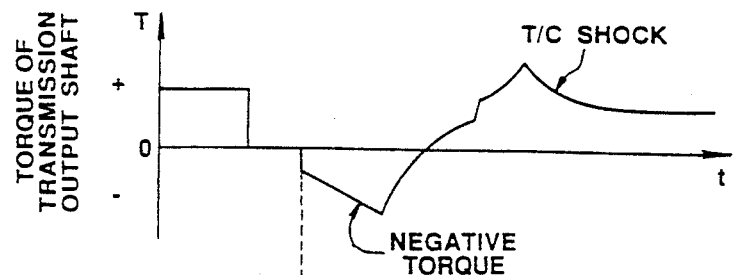
Figure 21B:
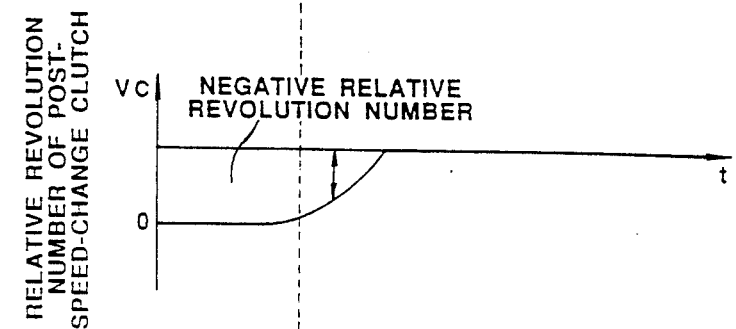
Figure 21C:
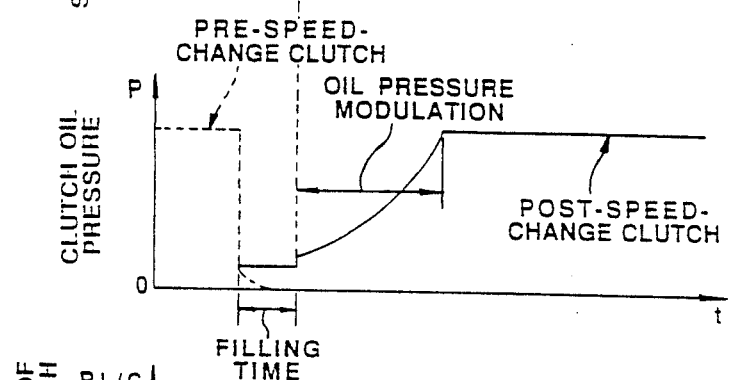
Figure 21D:
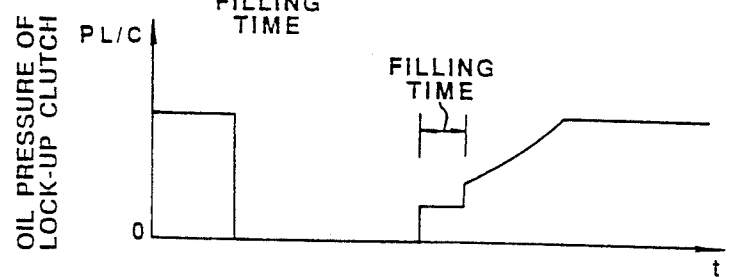
Figure 23A:
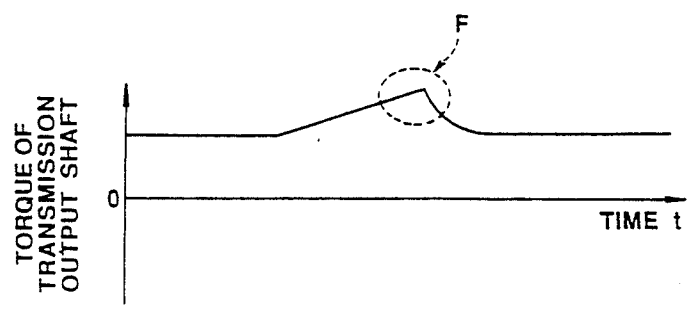
Figure 23B:
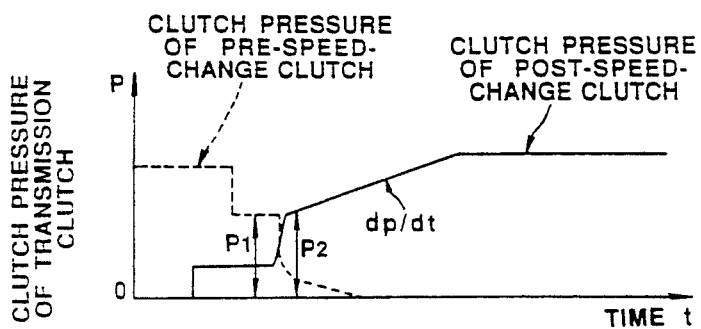

On the other hand, in cases where the amount of the accelerator operated is small (throttle amount S1), as shown in the part (b) of FIG. 20, the gradual increase pattern PT1 with a low increase rate is selected, and the post-speed-changing clutch 2nd is engaged for a sufficiently long time in accordance with this pattern PT1.

As shown in this FIG. 20, when the amount of the accelerator operated is small, the initial pressure $P_2'$ is set to a relatively small value.

In a situation where the brake is being engaged, thermal load acting on the clutch 2nd becomes very large during a speed change regardless of the magnitude of the amount of the accelerator operated. However, since the gradual increase pattern PT6 whose increase rate is slightly lower than that of the gradual increase pattern PT5 with a high increase rate is selected, and the clutch 2nd is engaged for a very short time, the damage caused to the clutch 2nd can be checked to a substantially small level.

As described above, in accordance with the second embodiment, in whatever state the amount of the accelerator operated, the state of operation of the brake, and the speed change mode may be, the operator is constantly able to avoid feeling a speed-change shock in terms of his or her sense, and it is possible to improve the durability of speed-changing clutches.

It should be noted that in the second embodiment the arrangement provided is such that a determination is made as to whether or not the brake is being operated, and if it is determined that the brake is being operated, the post-speed-changing clutch is subjected to a gradual increase in accordance with the gradual increase pattern PT6. However, the present invention is not restricted to the same, and it is naturally possible to provide an arrangement in which the amount of operation of the brake is detected as an analog value or a multiple value, a plurality of gradual increase patterns are set within the range of an oil increase rate corresponding to a case in which the amount of the accelerator operated is large, as illustrated at PT6' in FIG. 18, and a gradual increase pattern with a higher oil pressure increase rate is selected from among the plurality of patterns as the amount of operation of the brake increases, thereby engaging the post-speed-changing clutch with the pattern thus selected.

Incidentally, the state of operation of the brake can be determined by detecting the amount of the brake pedal pressed, the pressure of a master cylinder, or the like.

In addition, although in the second embodiment the amount of the accelerator operated is detected on the basis of the amount of the accelerator pedal pressed, the present invention is not restricted to the same and the pressure within the intake manifold of the engine may be detected, or a rotating angle of a lever of the governor may be detected.

In addition, although in the second embodiment a description has been given of the case where the vehicle weight I is fixed, the embodiment may be implemented such that the weight I is detected, and K, shown in Formula (2) is determined in correspondence with a detection value, whereby the gradual increase pattern is set so as to obtain an optimum targeted jerk value corresponding to the K, thus obtained.

Furthermore, although in the embodiment gradual increase patterns are stored in advance in the memory and one of them is read when a speed-change command has been given, this operation may be effected by an arithmetic operation.

Moreover, although in both the first and second embodiments the present invention is applied to a transmission system having a two-stage configuration composed of a sub transmission and a main transmission, it goes without saying that the present invention is applicable to a transmission system having a single-stage configuration or a transmission system composed of three or more stages.

Also, it goes without saying that the present invention is applicable not only to an automatic transmission vehicle but also to a manual transmission vehicle.

INDUSTRIAL APPLICABILITY

The present invention is applicable to speed change control of a transmission of a construction vehicle such as a dump truck, a wheel loader, or the like, or a passenger car, and particularly provides a control method and apparatus suitable for reducing a speed-change shock.

I claim:

1. A method of controlling a transmission system including an output shaft for receiving an output of an engine, an output shaft for outputting a drive force corresponding to said engine output to drive wheels, a plurality of speed-changing clutches provided for each of a plurality of speed stages and adapted to engage said input shaft and said output shaft at a time point when a pressure of supplied pressure oil exceeds a predetermined pressure so as to set a speed reduction rate corresponding to a speed stage selected by a speed-change command, and a plurality of pressure control valves respectively connected to said plurality of speed-changing clutches and adapted to supply pressure oil to one of said speed-changing clutches corresponding to said speed stage selected by said speed-change command during a filling time to fill out said one of said speed-changing clutches with the pressure oil and to gradually increase the pressure of the supplied oil after completion of the filling time so as to carry out said engagement, wherein said control valves are controlled when an output torque of said engine is more than a predetermined value and when a content of the speed-change command represents a shift down for selecting as a next speed stage a speed stage with a speed reduction rate greater than a presently selected speed stage, comprising the steps of:

a) turning off a first pressure control valve connected to a first speed-changing clutch corresponding to the presently selected speed stage upon the issuance of the speed-change command;

b) actuating a second pressure control valve connected to a second speed-changing clutch corresponding to said next speed stage at an operation start timing when a filling time of said second speed-changing clutch is completed, at a point of time when the relative number of revolutions of said second speed-changing clutch becomes zero, so as to supply pressure oil to said second speed-changing clutch; and c) confirming the completion of said filling time of said second speed-changing clutch corresponding to said next speed stage, and subsequently controlling said second pressure control valve connected to said second speed-changing clutch in such a manner as to gradually increase the oil pressure of said second speed-changing clutch.

2. A method of controlling a transmission system including a sub transmission for reducing a revolutional speed of an input shaft for receiving an output of an engine to transmit a revolution of said input shaft to an intermediate shaft, a main transmission for reducing a revolutional speed of said intermediate shaft to transmit a revolution of said intermediate shaft to an output shaft connected to drive wheels, a plurality of sub transmission clutches provided in said sub transmission and adapted to engage said input shaft and said intermediate shaft at a time point when a pressure of supplied pressure oil exceeds a predetermined pressure so as to set a speed reduction rate of said sub transmission to be a speed reduction rate corresponding to a speed stage selected by a speed-change command, a plurality of main transmission clutches provided in said main transmission and adapted to engage said intermediate shaft and said output shaft at a time point when the pressure of the supplied pressure oil exceeds the predetermined pressure so as to set a speed reduction rate of said main transmission to be a speed reduction rate corresponding to the speed stage selected by said speed-change command, and a plurality of pressure control valves respectively connected to said sub transmission clutches and said main transmission clutches and adapted to supply the pressure oil to one of said sub transmission clutches and one of said main transmission clutches respectively corresponding to said speed stage selected by said speed-change command during respective filling times to fill out said ones of sub and main transmission clutches with the pressure oil and gradually increase the pressure of the supplied oil within said ones of sub and main transmission clutches after completion of the respective filling times so as to carry out said engagement, wherein said pressure control valves are controlled when an output torque of said engine is more than a predetermined value, when a content of said speed-change command represents a shift down for selecting as a next speed stage a speed stage in which a speed reduction rate from said input shaft to said output shaft becomes greater than the presently selected speed stage, and when a first sub transmission clutch and a first main transmission clutch corresponding to the presently selected speed stage respectively differ from a second sub transmission clutch and a second main transmission clutch corresponding to said next speed stage, comprising the steps of:

a) turning off a first pressure control valve connected to said first sub transmission clutch and said first main transmission clutch corresponding to said presently selected speed stage upon the issuance of said speed-change command;

b) starting the supply of pressure oil to said second sub transmission clutch corresponding to said next speed stage at a point of time when said first pressure control valve connected to said first sub transmission clutch corresponding to said presently selected speed stage is turned off, and subsequently controlling a second pressure control valve connected to said second sub transmission clutch in such a manner as to gradually increase the oil pressure of said second sub transmission clutch;

c) actuating said second pressure control valve connected to said second main transmission clutch corresponding to said next speed stage at an operation start timing when a filling time of said second main transmission clutch is completed, at a point of time when the relative number of revolutions of said second main transmission clutch becomes zero, so as to supply the pressure oil to said second main transmission clutch; and d) confirming the completion of said filling time of said second main transmission clutch corresponding to said next speed stage, and subsequently controlling said second pressure control valve connected to said second main transmission clutch in such a manner as to gradually increase the oil pressure of said second main transmission clutch.

3. An apparatus for controlling a transmission system including an input shaft for receiving an output of an engine, an output shaft for outputting a drive force corresponding to the engine output to drive wheels, a plurality of speed-changing clutches provided for each of a plurality of speed stages and adapted to engage said input shaft and said output shaft at a time point when a pressure of supplied pressure oil exceeds a predetermined pressure so as to set a speed reduction rate corresponding to a speed stage selected by a speed-change command, and a plurality of pressure control valves respectively connected to said speed-changing clutches and adapted to supply pressure oil to one of said speed-changing clutches corresponding to said speed stage selected by said speed-change command during a filling time to fill out said one of said speed-changing clutches with the pressure oil and to change the oil pressure in response to an input electric command to gradually increase the oil pressure within said one of said speed changing clutches after completion of said filling time so as to carry out the engagement, said apparatus comprising;

first detecting means for detecting an a degree of actuation of an acceleration of a vehicle on which said transmission system is adapted to be mounted;

second detecting means for detecting a state of operation of a brake of such vehicle;

third detecting means for detecting a speed stage selected as a next speed stage by said speed-change command; and controlling means for determining a rate of gradual increase of pressure of the pressure oil supplied to another one of said speed-changing clutches corresponding to said next speed stage in such a manner that: if said second detecting means detects that said brake is not operating, said gradual increase rate increases as said degree of the actuation of the accelerator detected by said first detecting means increases; if said second detecting means detects that said brake is operating, said gradual increase rate becomes a predetermined value regardless of the degree of the actuation of the accelerator detected by said first detecting means; and the higher the next speed stage detected by said third detecting means is, the greater said gradual increase rate becomes; and for outputting an electrical command corresponding to the determined gradual increase rate to one of said pressure control valves connected to said another one of said speed-changing clutches corresponding to said next speed stage.

4. An apparatus for controlling a transmission system according to claim 3, wherein said controlling means includes a memory for storing in advance a plurality of oil pressure gradual increase rates corresponding to the degree of the actuation of the accelerator, the state of operation of said brake, and said next speed stage, and generates said electric command outputted to said one of said pressure control valves connected to said another one of said speed-changing clutches corresponding to said next speed stage on the basis of data read from said memory.

* * * * *